US012735240B2

(12) United States Patent
Asefvaziri

(10) Patent No.: US 12,735,240 B2
(45) Date of Patent: Sep. 15, 2026

(54) PACKING STRUCTURES AND ASSOCIATED METHODS OF ASSEMBLY

(71) Applicant: Flush Packaging LLC, Paso Robles, CA (US)

(72) Inventor: Heeva Asefvaziri, Paso Robles, CA (US)

(73) Assignee: Flush Packaging LLC, Paso Robles, CA (US)

(*) Notice: Subject to any disclaimer, the term of this patent is extended or adjusted under 35 U.S.C. 154(b) by 248 days.

(21) Appl. No.: 18/747,245

(22) Filed: Jun. 18, 2024

(65) Prior Publication Data

US 2025/0382118 A1 Dec. 18, 2025

(51) Int. Cl.

| | |
|---|---|
| ***B65D 81/127*** | (2006.01) |
| ***B31B 50/26*** | (2017.01) |
| ***B31B 105/00*** | (2017.01) |
| ***B31B 110/30*** | (2017.01) |
| ***B65D 5/32*** | (2006.01) |

(52) U.S. Cl.

CPC ............ *B65D 81/127* (2013.01); *B31B 50/26* (2017.08); *B65D 5/322* (2013.01); *B31B 2105/00* (2017.08); *B31B 2110/30* (2017.08); *B65D 2581/053* (2013.01)

(58) Field of Classification Search

CPC ............................ B65D 81/127; B65D 5/322; B65D 2581/053; B65D 5/5076; B65D 5/4804; B65D 5/48046; B31B 50/26; B31B 2105/00; B31B 2110/30

USPC .......................................................... 206/521

See application file for complete search history.

(56) References Cited

U.S. PATENT DOCUMENTS 654,508 A * 7/1900 Bohn .................. B65D 85/327 217/32
786,827 A * 4/1905 Meyer ................. B65D 85/327 217/32
1,963,677 A * 6/1934 Roberts ............. B65D 5/48038 206/427

(Continued)

OTHER PUBLICATIONS

Flush Packaging Website, 8 oz Half Pint Ball Regular Mouth Mason Jar Shipping Box product page, available before Jul. 2023, https://flushpackaging.com/products/8-oz-half-pint-ball-regular-mouth-mason-jar-shipping-box.

(Continued)

*Primary Examiner* — Nathan J Jenness
*Assistant Examiner* — Justin Caudill
(74) *Attorney, Agent, or Firm* — Vedder Price P.C.

(57) ABSTRACT

Numerous embodiments of packing structures and methods of assembly of packing structures are disclosed. In one embodiment, a packing structure comprises a base structure comprising a first folded section comprising a first plurality of grooves and a second folded section comprising a second plurality of grooves; and a plurality of cross structures, wherein each of the plurality of cross structures comprises a folded section comprising a pair of grooves, and wherein the plurality of cross structures are inserted into the base structure wherein the grooves in the pair of grooves in each of the plurality of cross structures are inserted into one of the first plurality of grooves and one of the second plurality of grooves, thereby forming one or more enclosed cells and a plurality of crush zones, wherein each of the one or more enclosed cells is adjacent to at least two of the plurality of crush zones.

19 Claims, 36 Drawing Sheets

(56) References Cited

U.S. PATENT DOCUMENTS

| | | | | | |
|---|---|---|---|---|---|
| 2,920,782 | A * | 1/1960 | Butters | B65D 5/48038 229/120.36 |
| 4,544,092 | A * | 10/1985 | Palmer | B65D 5/48038 217/31 |
| 4,591,090 | A * | 5/1986 | Collins | B65D 5/48038 229/120.36 |
| 4,934,588 | A * | 6/1990 | Johnske | B65D 5/48038 229/120.07 |
| 4,945,689 | A * | 8/1990 | Johnson, Jr. | E01C 11/16 52/668 |
| 5,332,149 | A * | 7/1994 | Gepfer | B65D 5/48038 229/120.36 |
| 2007/0034548 | A1* | 2/2007 | De Nola | B65D 5/48046 206/521 |

OTHER PUBLICATIONS

Flush Packaging Website, 8 oz Jelly Jar Shipping Box product page, available before Jul. 2023, https://flushpackaging.com/products/8-oz-jelly-jar-shipping-box.

Flush Packaging Website, 8 oz Straight Sided Jelly Jar Shipping Box product page, available before Jul. 2023, https://flushpackaging.com/products/8-oz-straight-sided-jelly-jar-shipping-box.

Flush Packaging Website, 16 oz Straight Sided Glass Tall Jar 6 Pack Shipping Box product page, available before Jul. 2023, https://flashpackaging.com/products/16-oz-straight-sided-glass-tall-jar-6-pack-shipping-box.

Flush Packaging Website, 16 oz Salsa Jar 6 Pack Shipping Box product page, available before Jul. 2023, https://flushpackaging.com/products/16-oz-salsa-jar-6-pack-shipping-box.

Flush Packaging Website, 16 oz Straight Side Glass Tall Jar 12 Pack Shipping Box product page, available before Jul. 2023, https://flushpackaging.com/products/16-oz-straight-sided-glass-tall-jar-12-pack-shipping-box.

Flush Packaging Website, 16 oz Pint Ball Regular Mouth Mason Jar Shipping Box product page, available before Jul. 2023, https://flushpackaging.com/products/16-oz-pint-ball-regular-mouth-mason-jar-shipping-box.

Flush Packaging Website, 16 oz Salsa Jar 12 Pack Shipping Box product page, available before Jul. 2023, https://flushpackaging.com/products/16-oz-salsa-jar-12-pack-shipping-box.

Flush Packaging Website, 16 oz Square Mason Jar Shipping Box product page, available before Jul. 2023, https://flushpackaging.com/products/16-oz-square-mason-jar-shipping-box.

Flush Packaging Website, 16 oz Canning Jar Shipping Box product page, available before Jul. 2023, https://flushpackaging.com/products/16-oz-canning-jar-shipping-box.

Flush Packaging Website, 16 oz Pint Ball Regular Mouth Mason Jar 2 Pack Shipping Box product page, available before Jul. 2023, https://flushpackaging.com/products/16-oz-pint-ball-regular-mouth-mason-jar-2-pack-shipping-box.

Flush Packaging Website, 16 oz Square Mason Jar 2 Pack Shipping Box product page, available before Jul. 2023, https //flushpackaging.com/products/16-oz-square-mason-jar-2-pack-shipping-box.

Flush Packaging Website, 16 oz Canning Jar 2 Pack Shipping Box product page, available before Jul. 2023, https://flushpackaging.com/products/16-oz-canning-jar-2-pack-shipping-box.

Flush Packaging Website, 16 oz Pint Ball Regular Mouth Mason Jar 3 Pack Shipping Box product page, available before Jul. 2023, https://flashpackaging.com/products/16-oz-pint-ball-regular-month-mason-jar-3-shipping-box.

Flush Packaging Website, 16 oz Square Mason Jar 3 Pack Shipping Box product page, available before Jul. 2023, https://flushpackaging.com/products/16-oz-square-mason-jar-3-pack-shipping-box.

Flush Packaging Website, 16 oz Canning Jar 3 Pack Shipping Box product page, available before Jul. 2023, https://flushpackaging com/products/16-oz-canning-jar-3-pack-shipping-box.

Flush Packaging Website, 6 oz Candle Tin 4 Pack Shipping Box product page, available before Jul. 2023, https //flushpackaging.com/products/6-oz-candle-tin-4-pack-shipping-box.

Flush Packaging Website, 12 oz Straight Sided Glass Jar 2 Pack Shipping Box product page, available before Jul. 2023, https://flushpackaging.com/products/12-oz-straight-sided-glass-jar-2-pack-shipping-box.

Flush Packaging Website, 12 oz Straight Sided Glass Jar Shipping Box product page, available before Jul. 2023, https //flushpackaging.com/products/12-oz-straight-sided-glass-jar-shipping-box.

Flush Packaging Website, 9 oz Straight Sided Glass Jar 12 Pack Shipping Box product page, available before Jul. 2023, https://flushpackaging.com/products/9-oz-straight-sided-glass-jar-12-pack-shipping-box.

Flush Packaging Website, 8 oz Straight Sided Jelly Jar 12 Pack Shipping Box product page, available before Jul. 2023, https://flushpackaging.com/products/8-oz-straight-sided-jelly-jar-12-pack-shipping-box.

Flush Packaging Website, Straight Sided Tumbler 6 Pack Shipping Box product page, available before Jul. 2023, https://flushpackaging.com/products/straight-sided-tumbler-6-pack-shipping-box.

Flush Packaging Website, Astra Tumbler 6 Pack Shipping Box product page, available before Jul. 2023, https://flushpackaging.com/products/astra-tumbler-6-pack-shipping-box.

Flush Packaging Website, Frosted Tumbler 6 Pack Shipping Box product page, available before Jul. 2023, https://flushpackaging.com/products/frosted-tumbler-6-pack-shipping-box.

Flush Packaging Website, Studio Tumbler 6 Pack Shipping Box product page, available before Jul. 2023, https //flushpackaging.com/products/studio-tumbler-6-pack-shipping-box.

Flush Packaging Website, 11 oz 917cd Heavy Base Rocks Tumbler 6 Pack Shipping Box product page, available before Jul. 2023, https://flushpackaging.com/products/11-oz-917cd-heavy-base-rocks-tumbler-6-pack-shipping-box.

Flush Packaging Website, 12.5 oz 2917 Tumbler 6 Pack Shipping Box product page, available before Jul. 2023,https://flushpackaging.com/products/12-5-oz-2917-tumbler-6-pack-shipping-box.

Flush Packaging Website, 8 oz Half Pint Ball Regular Mouth Mason Jar 3 Pack Shipping Box product page, available before Jul. 2023, https://flushpackaging.com/products/8-oz-half-pint-ball-regular-mouth-mason-jar-3-pack-shipping-box.

Flush Packaging Website, 8 oz Jelly Jar 3 Pack Shipping Box product page, available before Jul. 2023, https://flushpackaging.com/products/8-oz-jelly-jar-3-pack-shipping-box.

Flush Packaging Website, 8 oz Straight Sided Jelly Jar 3 Pack Shipping Box product page, available before Jul. 2023, https://flushpackaging.com/products/8-oz-straight-sided-jelly-jar-3-pack-shipping-box.

Flush Packaging Website, 9 oz Straight Sided Glass Jar 6 Pack Shipping Box product page, available before Jul. 2023, https://flushpackaging.com/products/9-oz-straight-sided-glass-jar-6-pack-shipping-box.

Flush Packaging Website, 8 oz Straight Sided Jelly Jar 6 Pack Shipping Box product page, available before Jul. 2023, https://flushpackaging.com/products/8-oz-straight-sided-jelly-jar-6-pack-shipping-box.

Flush Packaging Website, 12 oz Economy Round glass Jar Shipping Box product page, available before Jul. 2023, https://flushpackaging.com/products/12-oz-economy-round-glass-jar-shipping-box.

Flush Packaging Website, 12 oz Canning Jar Shipping Box product page, available before Jul. 2023, https://flushpackaging.com/products/12-oz-canning-jar-shipping-box.

Flush Packaging Website, 4 oz Straight Sided Glass Jar 3 Pack Shipping Box product page, available before Jul. 2023, https //flushpackaging.com/products/4-oz-straight-sided-glass-jar-3-pack-shipping-box.

Flush Packaging Website, 12 oz Economy Round Glass Jar 12 Pack Shipping Box product page, available before Jul. 2023, https://flushpackaging.com/products/12-oz-economy-round-glass-jar-12-pack-shipping-box.

Flush Packaging Website, 12 oz Canning Jar 12 Pack Shipping Box product page, available before Jul. 2023, https /flushpackaging.com/products/12-oz-canning-jar-12-pack-shipping-box.

(56) References Cited

OTHER PUBLICATIONS

Flush Packaging Website, 16 oz Pint Economy Round Glass Jar 12 Pack Shipping Box product page, available before Jul. 2023, https://flushpackaging.com/products/16-oz-pint-economy-round-glass-jar-12-pack-shipping-box.
Flush Packaging Website, 8 oz Half Pint Ball Regular Mouth Mason Jar 2 Pack Shipping Box product page, available before Jul. 2023, https://flushpackaging.com/products/8-oz-half-pint-ball-regular-mouth-mason-jar-2-pack-shipping-box.
Flush Packaging Website, 8 oz Jelly Jar 2 Pack Shipping Box product page, available before Jul. 2023, https://flushpackaging.com/products/8-oz-jelly-jar-2-pack-shipping-box.
Flush Packaging Website, 8 oz Straight Sided Jelly Jar 2 Pack Shipping Box product page, available before Jul. 2023, https://flushpackaging.com/products/8-oz-straight-sided-jelly-jar-2-pack-shipping-box.
Flush Packaging Website, 16 oz Straight Sided Glass Tall Jar 6 Pack Shipping Box product page, available before Jul. 2023, https://flushpackaging.com/products/16-oz-straight-sided-glass-tall-jar-6-pack-shipping-box.
Flush Packaging Website, 16 oz Pint Ball Regular Mouth Mason Jar 2 Pack Shipping Box product page, available before Jul. 2023, https://flushpackaging.com/products/16-oz-pint-ball-regular-mouth-mass-box.
Flush Packaging Website, 16 oz Pint Ball Regular Mouth Mason Jar 3 Pack Shipping Box product page, available before Jul. 2023, https://flushpackaging.com/products/16-oz-pint-ball-regular-mouth-mason-jar-3-pack-shipping-box.
Flush Packaging Website, 8 oz Candle Tin Shipping Box product page, available before Jul. 2023, https://flushpackaging.com/products/8-oz-candle-tin-shipping-box.
Flush Packaging Website, 8 oz Square Mason Jar 3 Pack Shipping Box product page, available before Jul. 2023, https://flushpackaging.com/products/8-oz-square-mason-jar-3-pack-shipping-box.
Flush Packaging Website, Straight Sided Tumbler 3 Pack Shipping Box product page, available before Jul. 2023, https://flushpackaging.com/products/straight-sided-tumbler-3-pack-shipping-box.
Flush Packaging Website, Frosted Tumbler 3 Pack Shipping Box product page, available before Jul. 2023, https://flushpackaging.com/products/frosted-tumbler-3-pack-shipping-box.
Flush Packaging Website, Studio Tumbler 3 Pack Shipping Box product page, available before Jul. 2023, https://flushpackaging.com/products/studio-tumbler-3-pack-shipping-box.
Flush Packaging Website, 8 oz Aura 3 Pack Shipping Box product page, available before Jul. 2023, https://flushpackaging.com/products/8-oz-aura-3-pack-shipping-box.
Flush Packaging Website, 11 oz 917cd Heavy Base Rocks Tumbler 3 Pack Shipping Box product page, available before Jul. 2023, https://flushpackaging.com/products/11-oz-917cd-heavy-base-rocks-tumbler-3-pack-shipping-box.
Flush Packaging Website, Libbey 2917 12.5 oz Tumbler 3 Pack Shipping Box product page, available before Jul. 2023, https://flushpackaging.com/products/libbey-2917-12-5-oz-tumbler-3-pack-shipping-box.
Flush Packaging Website, 9 oz Straight Sides Glass Jar 3 Pack Shipping Box product page, available before Jul. 2023, https://flushpackaging.com/products/9-oz-straight-sided-glass-jar-3-pack-shipping-box.
Flush Packaging Website, 8 oz Candle Tin 3 Pack Shipping Box product page, available before Jul. 2023, https://flushpackaging.com/products/8-oz-candle-tin-3-pack-shipping-box.
Flush Packaging Website, 8 oz Candle Tin 3 Pack Shipper B Stock product page, available before Jul. 2023, https://flushpackaging.com/products/8-oz-candle-tin-3-pack-shipper-b-stock.
Flush Packaging Website, 8 oz Square Mason Jar Shipping Box product page, available before Jul. 2023, https://flushpackaging.com/products/8-oz-square-mason-jar-shipping-box.
Flush Packaging Website, Straight Sided Tumbler Shipping Box product page, available before Jul. 2023, https://flushpackaging.com/products/straight-sided-tumbler-shipping-box.
Flush Packaging Website, Frosted Tumbler Shipping Box product page, available before Jul. 2023, https://flushpackaging.com/products/frosted-tumbler-shipping-box.
Flush Packaging Website, Studio Tumbler Shipping Box product page, available before Jul. 2023,https://flushpackaging.com/products/studio-tumbler-shipping-box.
Flush Packaging Website, 8 oz Aura Shipping Box product page, available before Jul. 2023, https://flushpackaging.com/products/8-oz-aura-shipping-box.
Flush Packaging Website, Libbey 2917 12.5 oz Tumbler 3 Pack Shipping Box product page, available before Jul. 2023, https //flushpackaging.com/products/libbey-2917-12-S-oz-tumbler-3-pack-shipping-box.
Flush Packaging Website, 9 oz Straight Sided Glass Jar Shipping Box product page, available before Jul. 2023, https://flushpackaging.com/products/9-oz-straight-sided-glass-jar-shipping-box.
Flush Packaging Website, 2 oz Candle Tin 6 Pack Shipping Box product page, available before Jul. 2023, https://flushpackaging.com/products/2-oz-candle-tin-6-pack-shipping-box.
Flush Packaging Website, 8 oz Square Mason Jar 2 Pack Shipping Box product page, available before Jul. 2023, https://flushpackaging.com/products/8-oz-square-mason-jar-2-pack-shipping-box.
Flush Packaging Website, Straight Sided Tumbler 2 Pack Shipping Box product page, available before Jul. 2023, https //flushpackaging.com/products/straight-sided-tumbler-2-pack-shipping-box.
Flush Packaging Website, Frosted Tumbler 2 Pack Shipping Box product page, available before Jul. 2023, https://flushpackaging.com/products/frosted-tumbler-2-pack-shipping-box.
Flush Packaging Website, Studio Tumbler 2 Pack Shipping Box product page, available before Jul. 2023, https://flushpackaging.com/products/studio-tumbler-2-pack-shipping-box.
Flush Packaging Website, 8 oz Aura 2 Pack Shipping Box product page, available before Jul. 2023, https://flushpackaging.com/products/8-oz-aura-2-pack-shipping-box.
Flush Packaging Website, 11 oz 917cd Heavy Base Rocks Tumbler 2 Pack Shipping Box product page, available before Jul. 2023, https://flushpackaging.com/products/11-oz-917cd-heavy-base-rocks-tumbler-2-pack-shipping-box.
Flush Packaging Website, Libbey 2917 12.5 oz Tumbler 2 Pack Shipping Box product page, available before Jul. 2023, https://flushpackaging.com/products/libbey-2917-12-5-oz-tumbler-2-pack-shipping-box.
Flush Packaging Website, 9 oz Straight Sided Glass Jar 2 Pack Shipping Box product page, available before Jul. 2023, https://flushpackaging.com/products/9-oz-straight-sided-glass-jar-2-pack-shipping-box.
Flush Packaging Website, 7-5625×4-375×1-8125 Small Shipping Mailer product page, available before Jul. 2023, https //flushpackaging.com/products/7-5625-x-4-375-x-1-8125-small-shipping-mailer.
Flush Packaging Website, 1 oz Glass Bottle 3 Pack Shipping Box product page, available before Jul. 2023, https://flushpackaging.com/products/1-oz-glass-bottle-3-pack-shipping-box.
Flush Packaging Website, 1 oz Glass Bottle 2 Pack Shipping Box Kit product page, available before Jul. 2023, https //flushpackaging.com/products/1-oz-glass-bottle-2-pack-shipping-box-kit.
Flush Packaging Website, 1 oz Glass Bottle Shipping Box Kit product page, available before Jul. 2023, https://flushpackaging.com/products/1-oz-glass-bottle-shipping-box-kit.
Flush Packaging Website, 1 oz Glass Bottle Shipping Insert product page, available before Jul. 2023, https://flushpacking.com/products/1-oz-glass-bottle-shipping-insert.
Flush Packaging Website, 2 oz Candle Tin 3 Pack Shipping Box product page, available before Jul. 2023, https://flushpackaging.com/products/2-oz-candle-tin-3-pack-shipping-box.
Flush Packaging Website, 4 oz Straight Sided Glass Jar 3 Pack Retail Box product page, available before Jul. 2023, https://flushpackaging.com/products/4-oz-straight-sided-glass-jar-3-pack-retail-box.
Flush Packaging Website, 8 oz Half Pint Ball Regular Mouth Mason Jar 6 Pack Shipping Box product page, available before Jul. 2023, https://flushpackaging.com/products/8-oz-half-pint-ball-regular-mouth-mason-jar-6-pack-shipping-box.

(56) References Cited

OTHER PUBLICATIONS

Flush Packaging Website, 8 oz Jelly Jar 6 Pack Shipping Box product page, available before Jul. 2023, https://flushpackaging.com/products/8-oz-jelly-jar-6-pack-shipping-box.
Flush Packaging Website, 8 oz Half Pint Ball Regular Mouth Mason Jar 12 Pack Shipping Box product page, available before Jul. 2023, https://flushpackaging.com/products/8-oz-half-pint-ball-regular-mouth-mason-jar-12-pack-shipping-box.
Flush Packaging Website, 8 oz Jelly Jar 12 Pack Shipping Box product page, available before Jul. 2023, https://flushpackaging.com/products/8-oz-jelly-jar-12-pack-shipping-box.
Flush Packaging Website, 16 oz Pint Ball Regular Mouth Mason Jar 6 Pack Shipping Box product page, available before Jul. 2023, https://flushpackaging.com/products/16-oz-pint-ball-regular-mouth-mason-jar-6-pack-shipping-box.
Flush Packaging Website, 16 oz Square Mason Jar 6 Pack Shipping Box product page, available before Jul. 2023, https://flushpackaging.com/products/16-oz-square-mason-jar-6-pack-shipping-box.
Flush Packaging Website, 16 oz Canning Jar 6 Pack Shipping Box product page, available before Jul. 2023, https://flushpackaging.com/products/16-oz-canning-jar-6-pack-shipping-box.
Flush Packaging Website, 16 oz Pint Ball Regular Mouth Mason Jar 12 Pack Shipping Box product page, available before Jul. 2023, https://flushpackaging.com/products/16-oz-pint-ball-regular-mouth-mason-jar-12-pack-shipping-box.
Flush Packaging Website, 16 oz Square Mason Jar 12 Pack Shipping Box product page, available before Jul. 2023, https://flushpackaging.com/products/16-oz-square-mason-jar-12-pack-shipping-box.
Flush Packaging Website, 16 oz Canning Jar 12 Pack Shipping Box product page, available before Jul. 2023, https://flushpackaging.com/products/16-oz-canning-jar-12-pack-shipping-box.
Flush Packaging Website, 32 oz Quart Ball Wide Mouth Mason Jar 3 Pack Shipping Box product page, available before Jul. 2023, https://flushpackaging.com/products/32-oz-quart-ball-wide-mouth-mason-jar-3-pack-shipping-box.
Flush Packaging Website, 12 oz Aura Shipping Box product page, available before Jul. 2023, https://flushpackaging.com/products/12-oz-aura-shipping-box.
Flush Packaging Website, 16 oz Straight Sided Glass Squat Jar 12 Pack Shipping Box product page, available before Jul. 2023, https://flushpackaging.com/products/16-oz-straight-sided-glass-squat-jar-12-pack-shipping-box.
Flush Packaging Website, 12 oz Serafina 12 Pack Shipping Box product page, available before Jul. 2023, https://flushpackaging.com/products/12-oz-serafina-12-pack-shipping-box.
Flush Packaging Website, Studio Tumbler 12 Pack Shipping Box product page, available before Jul. 2023, https://flushpackaging.com/products/studio-tumbler-12-pack-shipping-box.
Flush Packaging Website, Astra Tumbler 12 Pack Shipping Box product page, available before Jul. 2023, https://flushpackaging.com/products/astra-tumbler-12-pack-shipping-box.
Flush Packaging Website, Frosted Tumbler 12 Pack Shipping Box product page, available before Jul. 2023, https://flushpackaging.com/products/frosted-tumbler-12-pack-shipping-box.
Flush Packaging Website, 11 oz 917cd Heavy Base Rocks Tumbler 12 Pack Shipping Box product page, available before Jul. 2023, https://flushpackaging.com/products/11-oz-917cd-heavy-base-rocks-tumbler-12-pack-shipping-box.
Flush Packaging Website, 12.5 oz 2917 Tumbler 12 Pack Shipping Box product page, available before Jul. 2023, https://flushpackaging.com/products/12-5-oz-2917-tumbler-12-pack-shipping-box.
Flush Packaging Website, 3 oz Candle Tin 3 Pack Shipping Box product page, available before Jul. 2023, https://flushpackaging.com/products/3-oz-candle-tin-3-pack-shipping-box.
Flush Packaging Website, 12 oz Aura 2 Pack Shipping Box product page, available before Jul. 2023, https://flushpackaging.com/products/12-oz-aura-2-pack-shipping-box.
Flush Packaging Website, 12 oz Aura 3 Pack Shipping Box product page, available before Jul. 2023, https://flushpackaging.com/products/12-oz-aura-3-pack-shipping-box.
Flush Packaging Website, 12 oz Straight Sided Glass Jar 3 Pack Shipping Box product page, available before Jul. 2023, https://flushpackaging.com/products/12-oz-straight-sided-glass-jar-3-pack-shipping-box.

* cited by examiner

PACKING STRUCTURES AND ASSOCIATED METHODS OF ASSEMBLY

FIELD OF THE INVENTION

Numerous embodiments of packing structures and associated methods of assembly are disclosed.

BACKGROUND OF THE INVENTION

Increasingly, consumers obtain their physical goods from e-commerce sites. Typically, a consumer orders a physical good from a supplier on a website or app, and the supplier then ships the physical good to the consumer using the postal service or shipping courier. If the physical good is fragile, the supplier might enclose the physical good in paper, bubble wrap, solid foam, or foam peanuts and place the enclosed good in a carboard shipping box. These traditional packing structures and methods have structural limitations, and the physical good often can be damaged if an external object hits the cardboard shipping box, such as when the box is dropped onto another object or the ground. For example, if a heavy object is surrounded by foam peanuts, the object can shift within the cardboard shipping box such that the object receives force from the external object upon impact and can be damaged.

What is needed are improved packing structures and methods of assembly.

SUMMARY OF THE INVENTION

Numerous embodiments of packing structures and associated methods of assembly are disclosed.

In one embodiment, a packing structure comprises a base structure comprising a first folded section comprising a first plurality of grooves and a second folded section comprising a second plurality of grooves; and a plurality of cross structures, wherein each of the plurality of cross structures comprises a folded section comprising a pair of grooves, and wherein the plurality of cross structures are inserted into the base structure wherein the grooves in the pair of grooves in each of the plurality of cross structures are inserted into one of the first plurality of grooves and one of the second plurality of grooves, thereby forming one or more enclosed cells and a plurality of crush zones, wherein each of the one or more enclosed cells is adjacent to at least two of the plurality of crush zones.

In another embodiment, a packing structure comprises a first base structure comprising a first section comprising a first plurality of grooves and a second section comprising a second plurality of grooves, wherein the first section is a folded section; a second base structure comprising a third section comprising a third plurality of grooves and a fourth section comprising a fourth plurality of grooves, wherein the third section is a folded section and the second section of the first base structure is placed adjacent to the fourth section of the second base structure; and a plurality of cross structures, wherein each of the plurality of cross structures comprises a folded section comprising a plurality of grooves, and wherein the plurality of cross structures are inserted into the first base structure and the second base structure wherein the plurality of grooves in each cross structure are cojoined with one of the first plurality of grooves, one of the second plurality of grooves, one of the third plurality of grooves, and one of the fourth plurality of grooves, thereby forming one or more enclosed cells and a plurality of crush zones, wherein each of the one or more enclosed cells comprises four sides each adjacent to one of the plurality of crush zones or another enclosed cell.

In another embodiment, a packing structure comprises a first base structure comprising a first section comprising a first plurality of grooves and a second section comprising a second plurality of grooves, wherein the first section is a folded section; a second base structure comprising a third section comprising a third plurality of grooves and a fourth section comprising a fourth plurality of grooves, wherein the third section is a folded section; one or more expansion base structures placed between the first base structure and the second base structure, each of the one or more expansion base structures comprising a plurality of grooves; and a plurality of cross structures, wherein each of the plurality of cross structures comprises a folded section comprising a plurality of grooves, and wherein the plurality of cross structures are inserted into the first base structure, the second base structure, and the one or more expansion base structures wherein the plurality of grooves in each cross structure are cojoined with one of the first plurality of grooves, one of the second plurality of grooves, one of the third plurality of grooves, and one of the fourth plurality of grooves and two grooves in each of the one or more expansion base structures, thereby forming one or more enclosed cells and a plurality of crush zones, wherein each of the one or more enclosed cells comprises four sides each adjacent to one of the plurality of crush zones or another enclosed cell.

In another embodiment, a method of assembling a packing structure comprises forming a base structure by: folding a first section along a first axis to abut a second section to form a first folded section, folding a third section along a second axis to abut a fourth section to form a second folded section, folding the first folded section to be perpendicular to a bottom section; and folding the second folded section to be perpendicular to the bottom section; forming a plurality of cross structures by for each of the plurality of cross structures, folding a section along an axis to abut another section; and inserting the plurality of cross structures into the base structure to form one or more enclosed cells and a plurality of crush zones, where each of the one or more enclosed cells comprises four sides each adjacent to one of the plurality of crush zones or another enclosed cell.

In another embodiment, a method of assembling a packing structure comprises forming a first base structure by folding a first section along a first axis to abut a second section to form a first folded section, folding the first folded section along a second axis so that the first folded section is perpendicular to a first bottom section, and folding a third section along a third axis so that the third section is perpendicular to the first bottom section; forming a second base structure by folding a fourth section along a fourth axis to abut a fifth section to form a second folded section, folding the second folded section along a fifth axis so that the second folded section is perpendicular to a second bottom section, and folding a sixth section along a sixth axis so that the sixth section is perpendicular to the second bottom section; forming one or more expansion base structures by, for each of the one or more expansion base structures folding a seventh section along a seventh axis so that the seventh section is perpendicular to a third bottom section, and folding an eighth section along an eighth axis so that the eighth section is perpendicular to the third bottom section; forming a plurality of cross structures by for each of the plurality of cross structures, folding a section along an axis to abut another section; and inserting the plurality of cross structures into the first base structure, the second base structure, and the one or more expansion base structures to form one or more enclosed cells and a plurality of crush zones, wherein each of the one or more enclosed cells comprises four sides each adjacent to one of the plurality of crush zones or another enclosed cell.

DETAILED DESCRIPTION OF THE INVENTION

FIGS. 1 to 10 depict 1-cell packing structure 100 and a method of assembling 1-cell packing structure 100.

Figure 1:
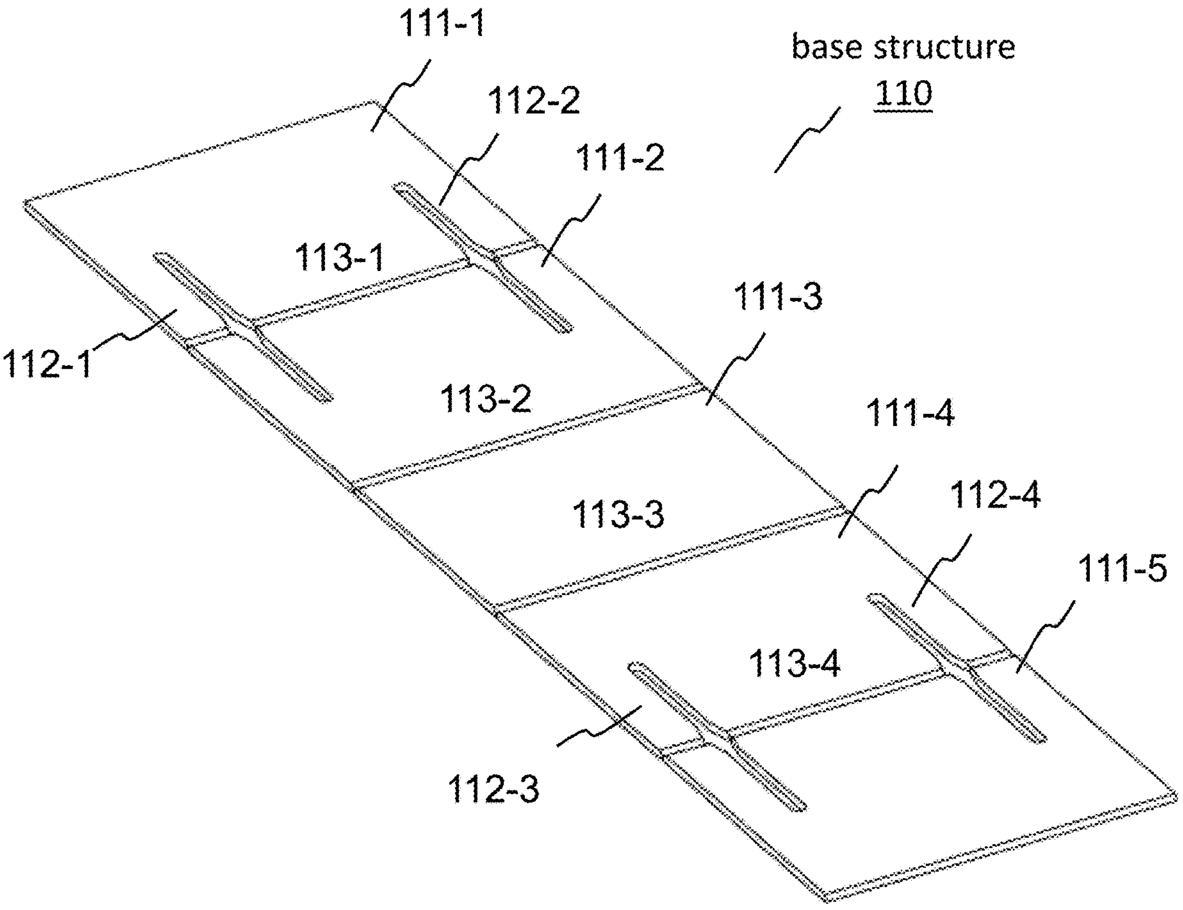
FIG. 1 depicts a base structure of a 1-cell packing structure.

FIG. 1 depicts base structure 110. In this example, base structure 110 is a single structure formed of a single piece of cardboard or other material. Base structure 110 comprises sections 111-1, 111-2, 111-3, 111-4, and 111-5; grooves 112-1, 112-2, 112-3, and 112-4; and axes 113-1, 113-2, 113-3, and 113-4. Axes 113-1, 113-2, 113-3, and 113-4 can be formed using known crease or perforation techniques.

Figure 2:
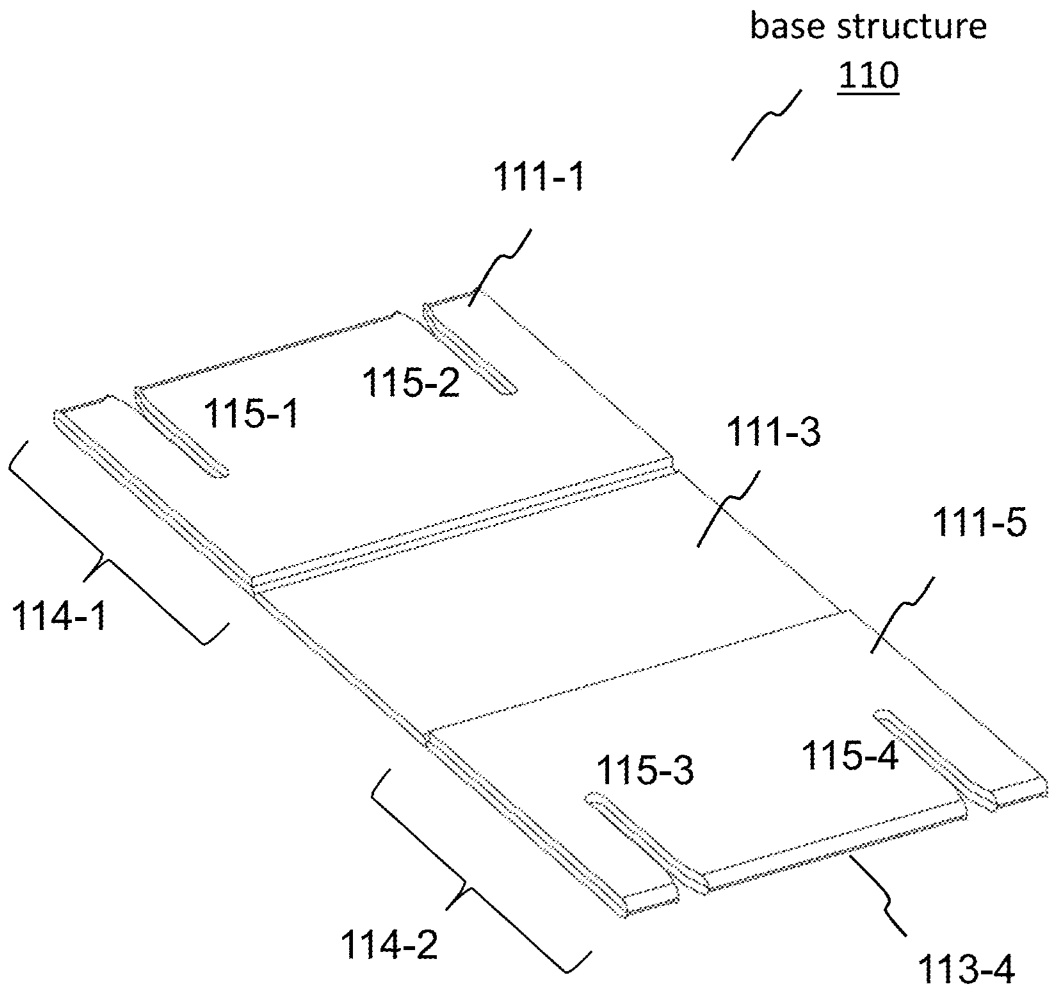
FIG. 2 depicts the base structure of the 1-cell packing structure.

FIG. 2 depicts base structure 110 with section 111-1 folded over to abut section 111-2 (hidden from view) along axis 113-1 (hidden from view) to form folded section 114-1 and section 111-5 folded over to abut section 111-4 (hidden from view) along axis 113-4 to form folded section 114-2. Due to the folding, grooves 112-1, 112-2, 112-3, and 112-4 are doubled over to form grooves 115-1, 115-2, 115-3, and 115-4, respectively. Grooves 115-1, 115-2, 115-3, and 115-4 are open to the outer perimeter of base structure 110. The fold in folded section 114-1 causes outward forces to emerge from the outer surfaces of folded section 114-1, and the fold in folded section 114-2 causes outward forces to emerge from the outer surfaces of folded section 114-2.

Figure 3:
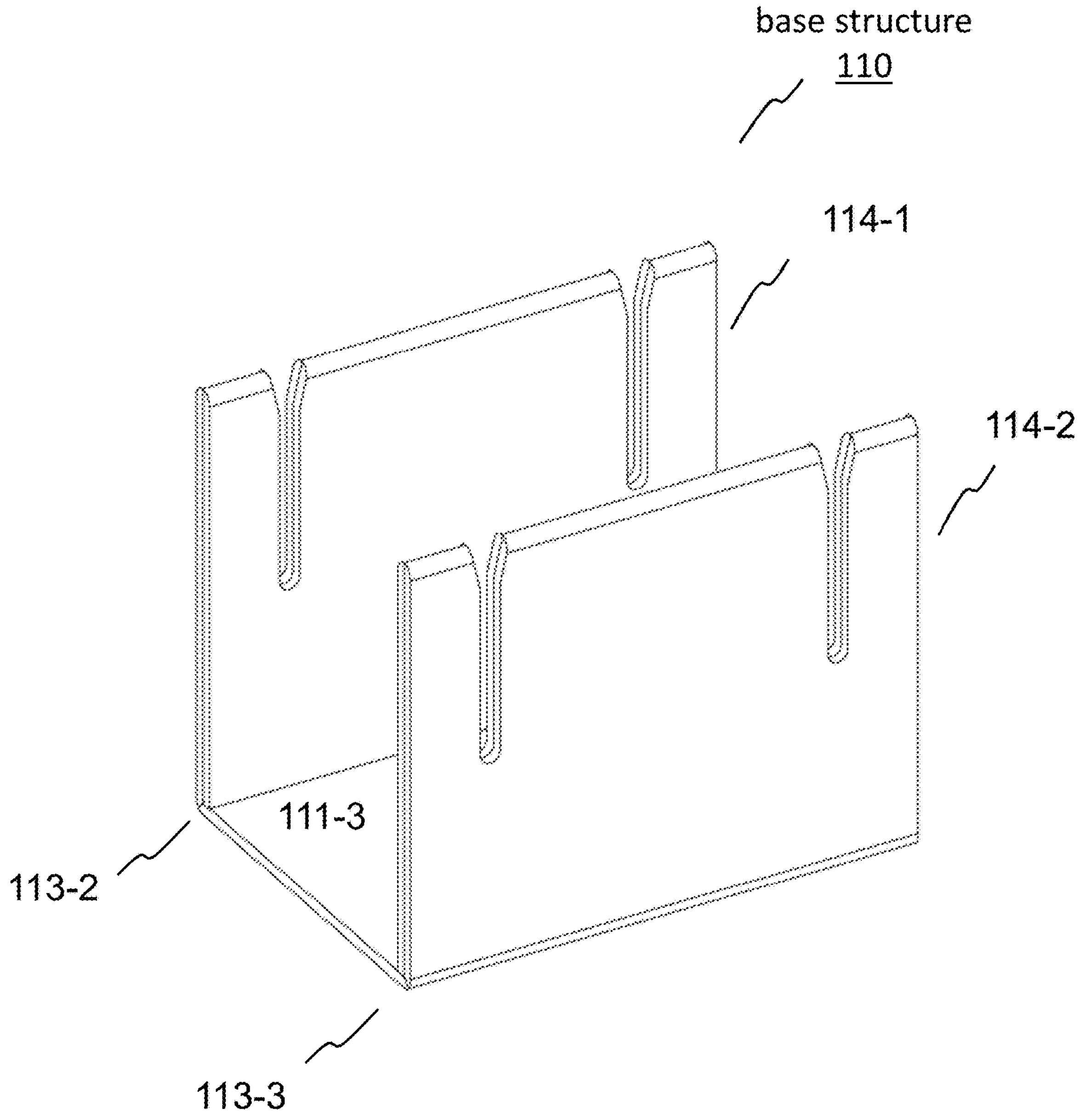
FIG. 3 depicts the base structure of the 1-cell packing structure.

FIG. 3 depicts base structure 110 with folded section 114-1 folded upward along axis 113-2 to be perpendicular to section 111-3 and folded section 114-2 folded upward along axis 113-3 to be perpendicular to section 111-3.

Figure 4:
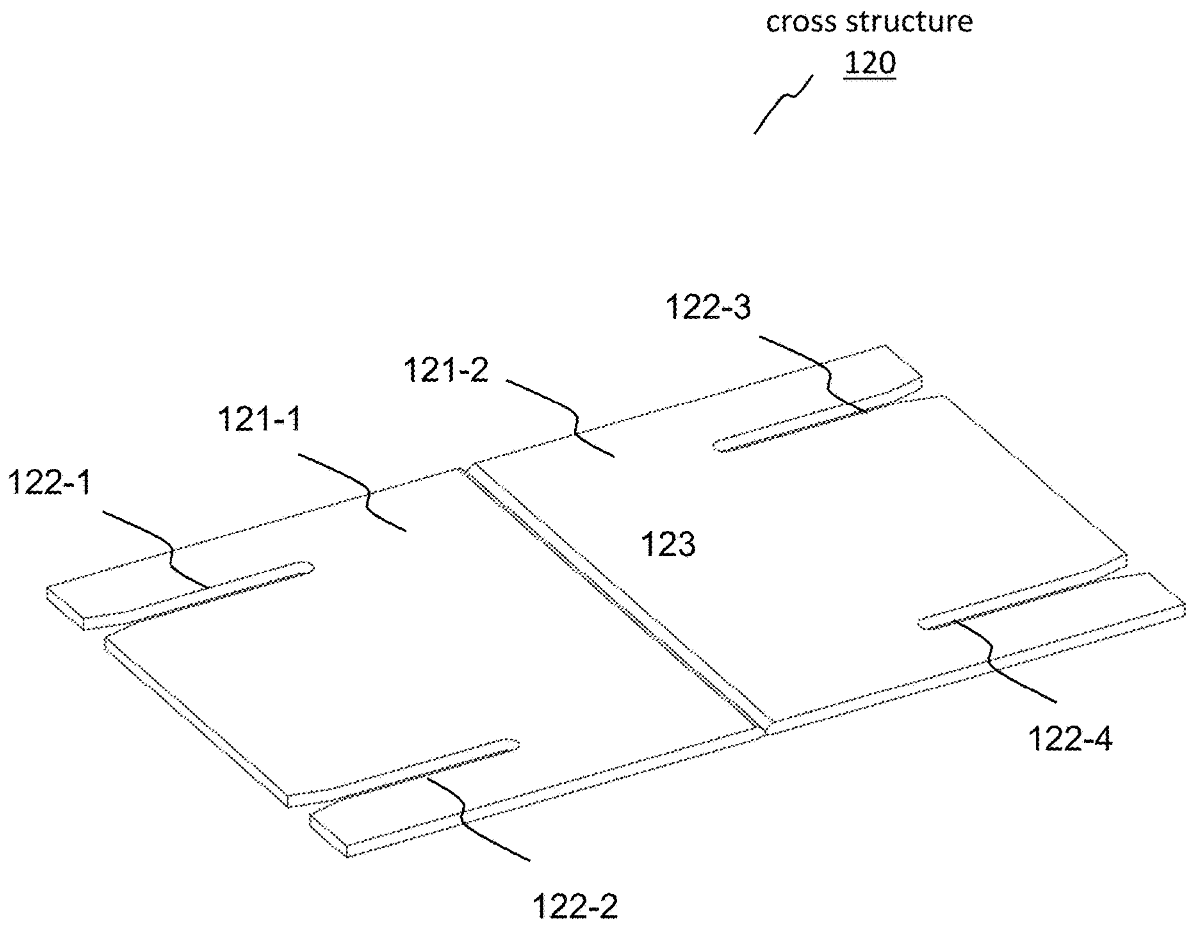
FIG. 4 depicts a cross structure of the 1-cell packing structure.

FIG. 4 depicts cross structure 120. In this example, cross structure 120 is a single structure formed of a single piece of cardboard or other material. Cross structure comprises sections 121-1 and 121-2; grooves 122-1, 122-2, 122-3, and 122-4; and axis 123. Axis 123 can be formed using known crease or perforation techniques.

Figure 5:
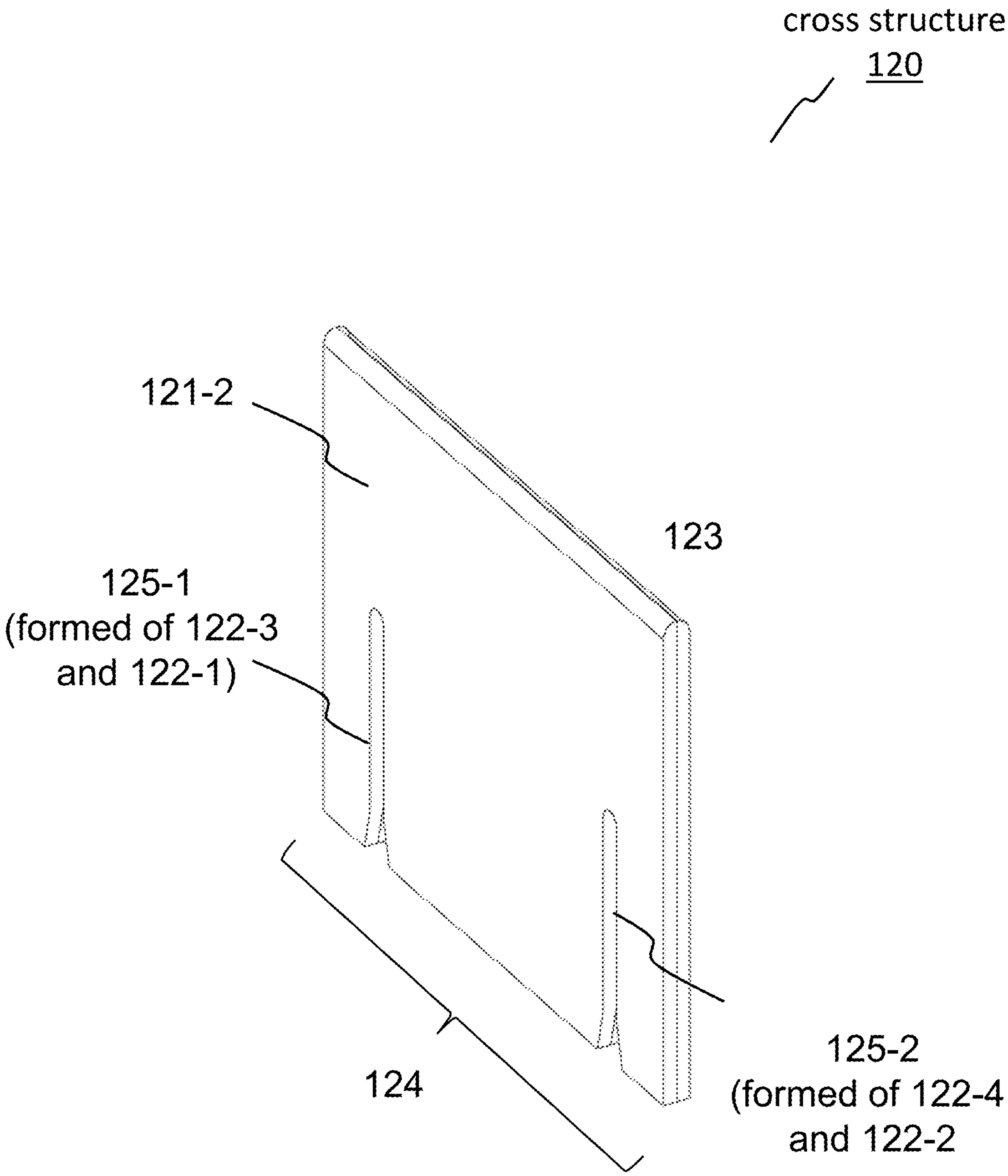
FIG. 5 depicts the cross structure of the 1-cell packing structure.

FIG. 5 depicts cross structure 120 with section 121-2 folded over section 121-1 (hidden from view) along axis 123 to form folded section 124. Due to the folding, grooves 122-3 and 122-1 are aligned to form groove 125-1 and grooves 122-4 and 122-2 are aligned to form groove 125-2. The fold in folded section 124 causes outward forces to emerge from the outer surfaces of folded section 124.

Figure 6:
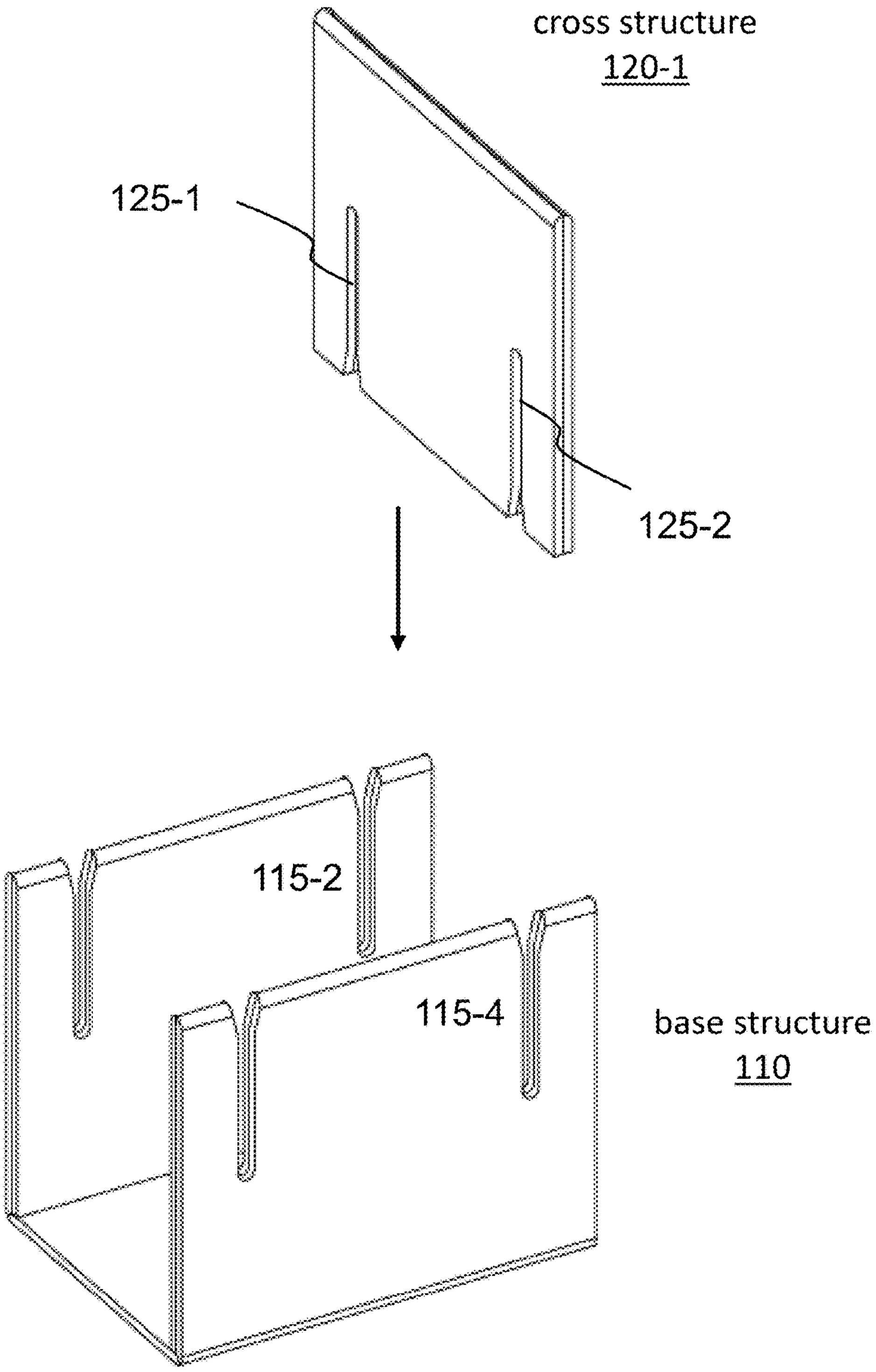
FIG. 6 depicts a first cross structure being inserted into the base structure of the 1-cell packing structure.

FIG. 6 depicts base structure 110 and cross structure 120-1, which is an instance of cross structure 120. Here, cross structure 120-1 is about to be inserted into base structure 110, with grooves 125-1 and 125-2 to be cojoined with grooves 115-2 and 115-4, respectively.

Figure 7:
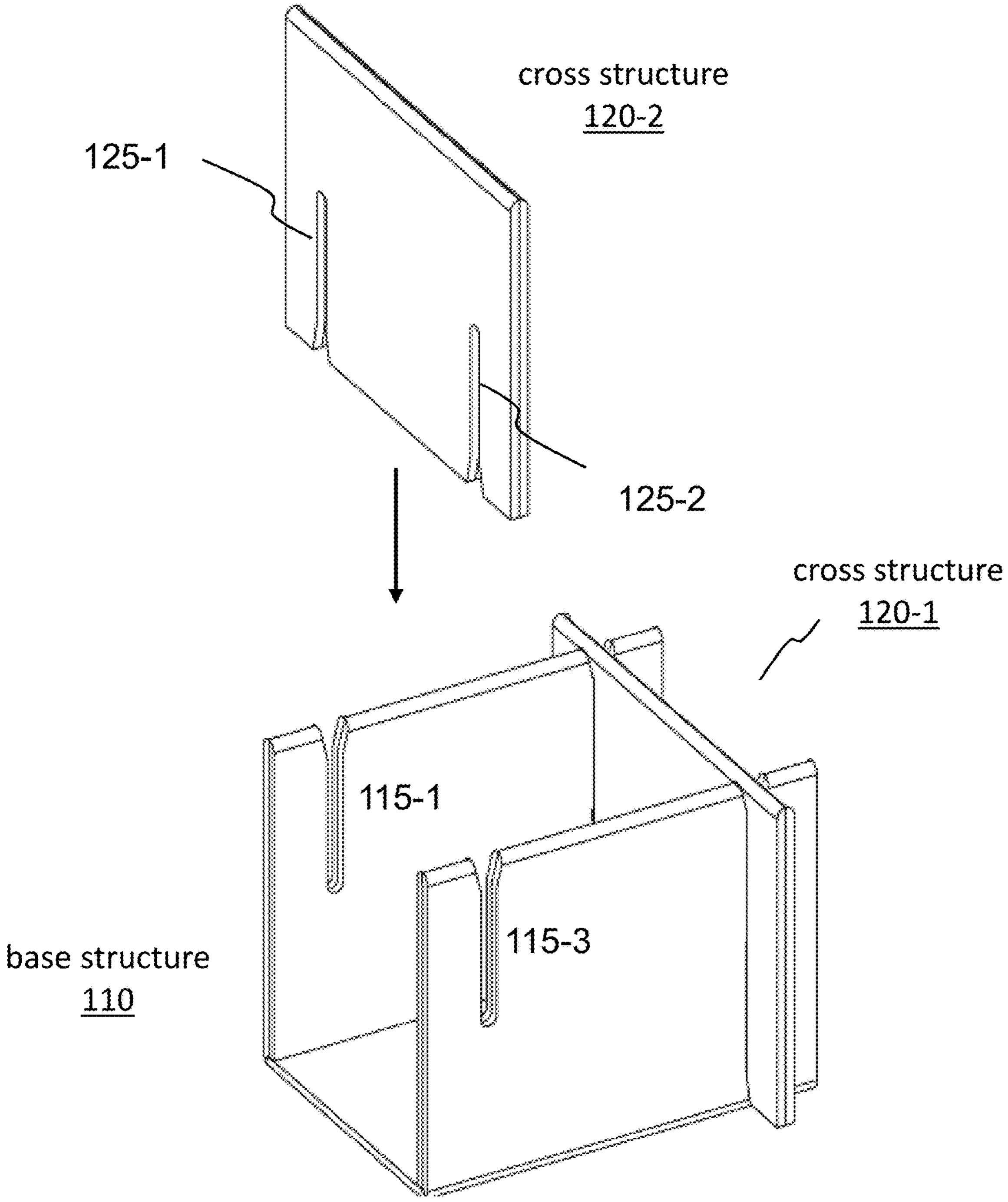
FIG. 7 depicts a first cross structure inserted into the base structure of the 1-cell packing structure and a second cross structure being inserted into the base structure of the 1-cell packing structure.

FIG. 7 depicts cross structure 120-1 fully inserted into base structure 110. As explained previously, the folds in base structure 110 creates outward facing forces, which in this configuration will cause the folded structure in base structure 110 to exert force against the grooves of cross structure 120-1. Similarly, the fold in cross structure 120-1 creates outward facing forces, which in this configuration will case the folded structure in cross structure 120-1 to exert force against the grooves of base structure 110. The end result is that cross structure 120-1 will be snugly fit in base structure 110 with a significant amount of friction being created to keep cross structure 120-1 firmly in place in base structure 110. FIG. 7 also depicts cross structure 120-2, which is an instance of cross structure 120. Cross structure 120-2 is about to be inserted into base structure 110, with grooves 125-1 and 125-2 to be inserted into grooves 115-1 and 115-3, respectively.

Figure 8:
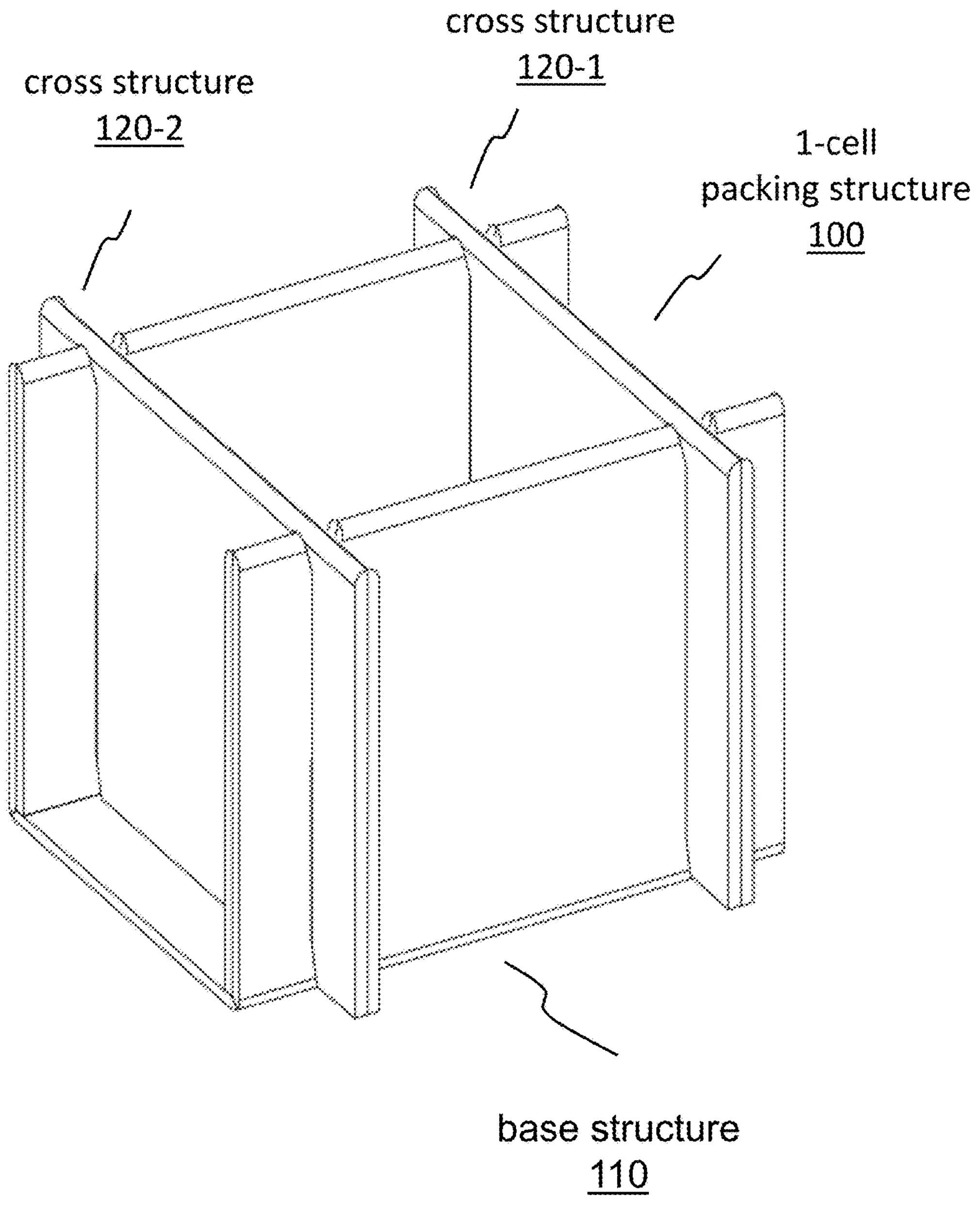
FIG. 8 depicts the 1-cell packing structure.

FIG. 8 depicts 1-cell packing structure 100, which comprises base structure 110, cross structure 120-1, and cross structure 120-2. Cross structures 120-1 and 120-2 are fully inserted into base structure 110. For the same reasons described above with respect to cross structure 120-1, cross structure 120-2 is snugly fit in base structure 110 with a significant amount of friction being created to keep cross structure 120-2 firmly in place in base structure 110.

Figure 9:
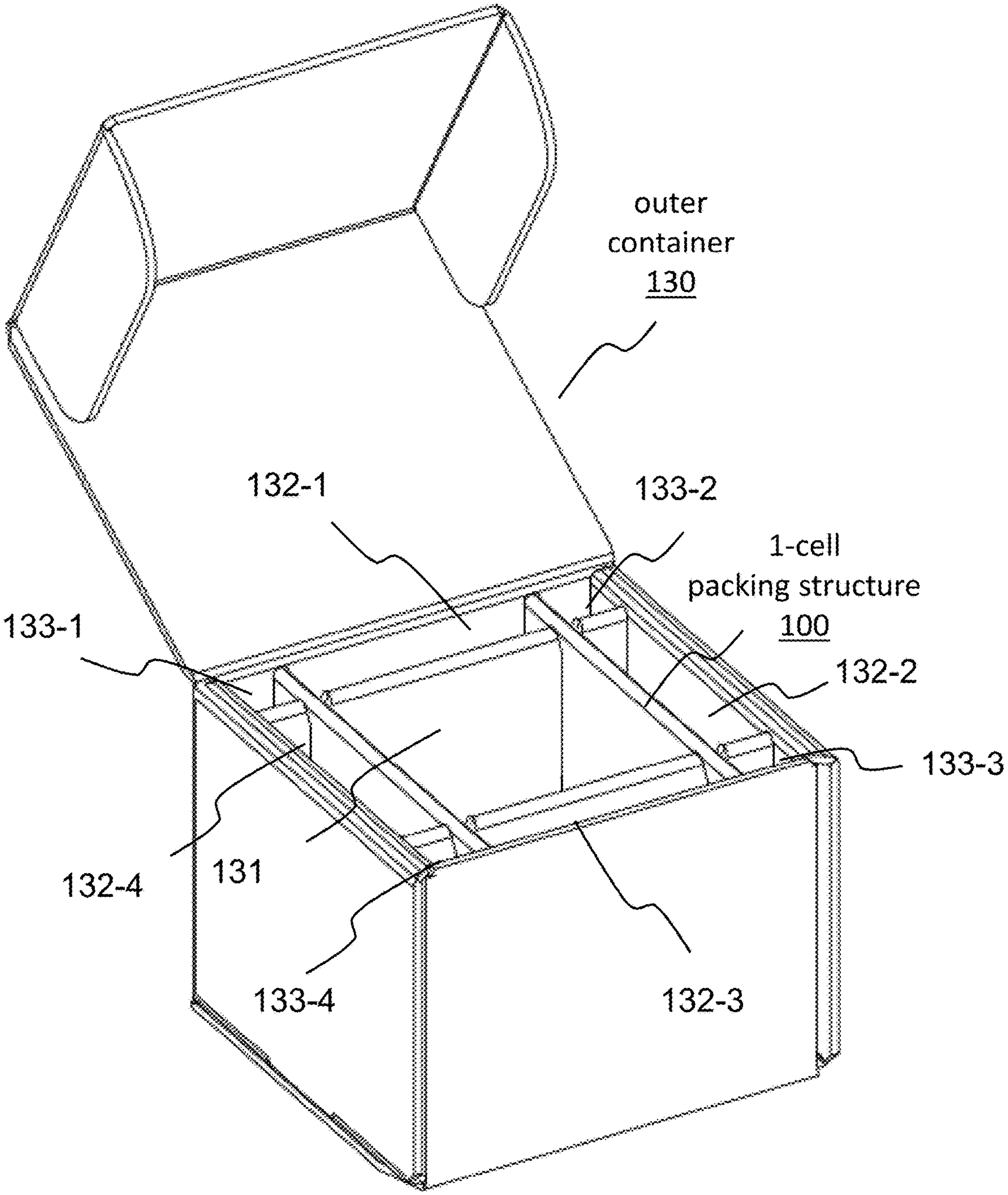
FIG. 9 depicts the 1-cell packing structure inserted into the outer container.

FIG. 9 depicts 1-cell packing structure 100 inserted into outer container 130. Outer container 130 can be, for example, a shipping box formed of cardboard or plastic. 1-cell packing structure 100 comprises enclosed cell 131, which is enclosed by walls on four sides formed by base structure 110 and cross structures 120-1 and 120-2 and physically separated from the four sides of outer container 130 by crush zones 132-1, 132-2, 132-3, and 132-4 and corner crush zones 133-1, 133-2, 133-3, and 133-4. Enclosed cell 131 is the location where the object to be shipped is placed. Base structure 110 and cross structures 120-1 and 120-2 are in physical contact with the four sides of outer container 130 and provide structural rigidity to absorb impacts on outer container 130. Furthermore, crush zones 132-1, 132-2, 132-3, and 132-4 and corner crush zones 133-1, 133-2, 133-3, and 133-4 provide volumes of space around enclosed cell 131 where any impact by an external object against outer container 130 can result with the external object protruding into a crush zone or corner crush zone and deforming outer container 130 without providing any impact to enclosed cell 131 or its contents.

Figure 10:
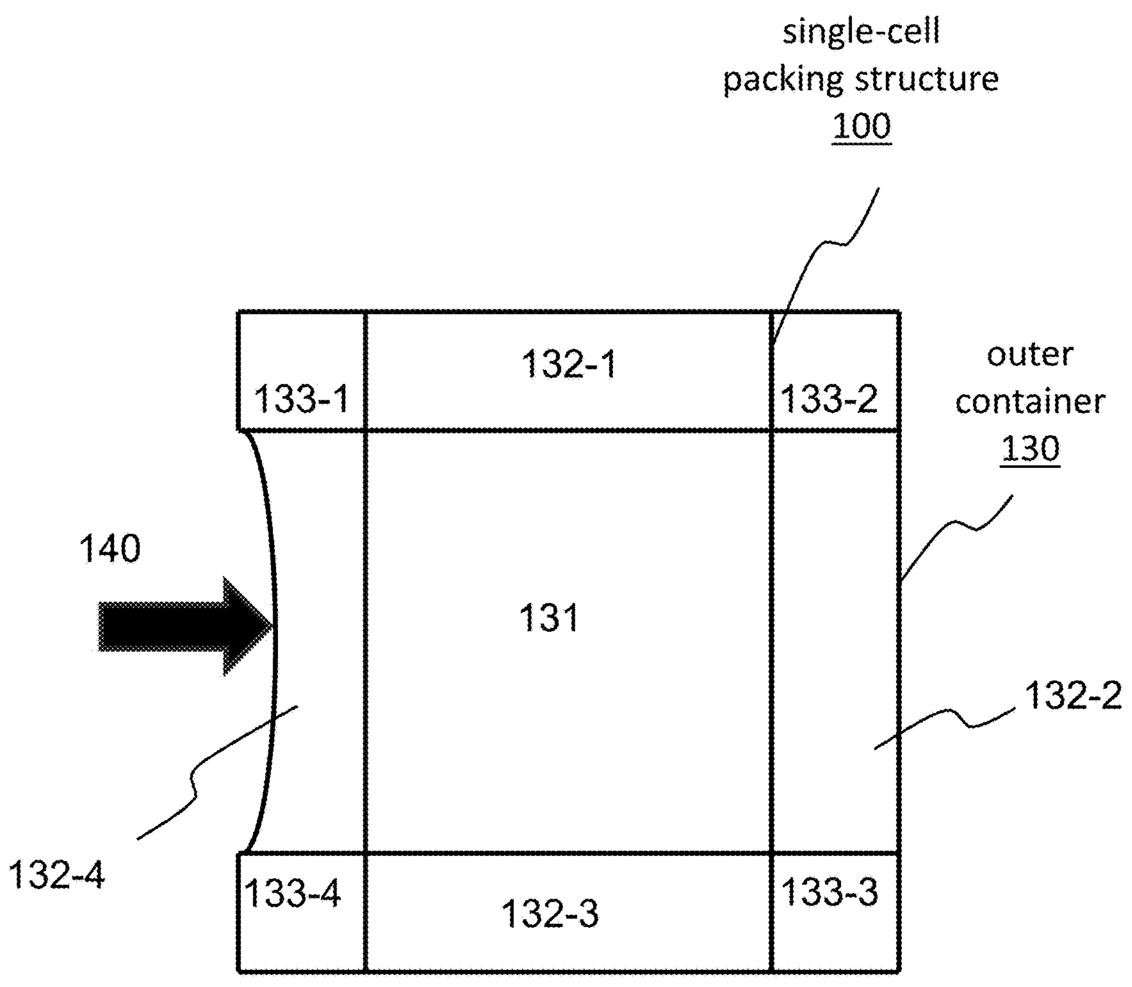
FIG. 10 depicts a top view of an external object impacting the outer container of the 1-cell packing structure.

FIG. 10 depicts 1-cell packing structure 100 within outer container 130 from a top-view. It can be seen that crush zones 132-1, 132-2, 132-3, and 132-4 provide safety cushions on four sides of enclosed cell 131 and corner crush zones 133-1, 133-2, 133-3, and 133-4 provide safety cushions on four vertices of enclosed cell 131. In this example, an external object 140 impacts the side of outer container 130 (as might happen, for example, during the shipping process or if outer container 130 falls onto another object). Crush zone 132-4 absorbs the impact of external object 140 and outer container 130 is deformed in this area without allowing impact to occur to enclosed cell 131. That is, enclosed cell 131 is fully protected from force from external object 140.

FIGS. 11 to 20 depict 2-cell packing structure 1100 and a method of assembling 2-cell packing structure 1100.

Figure 11:
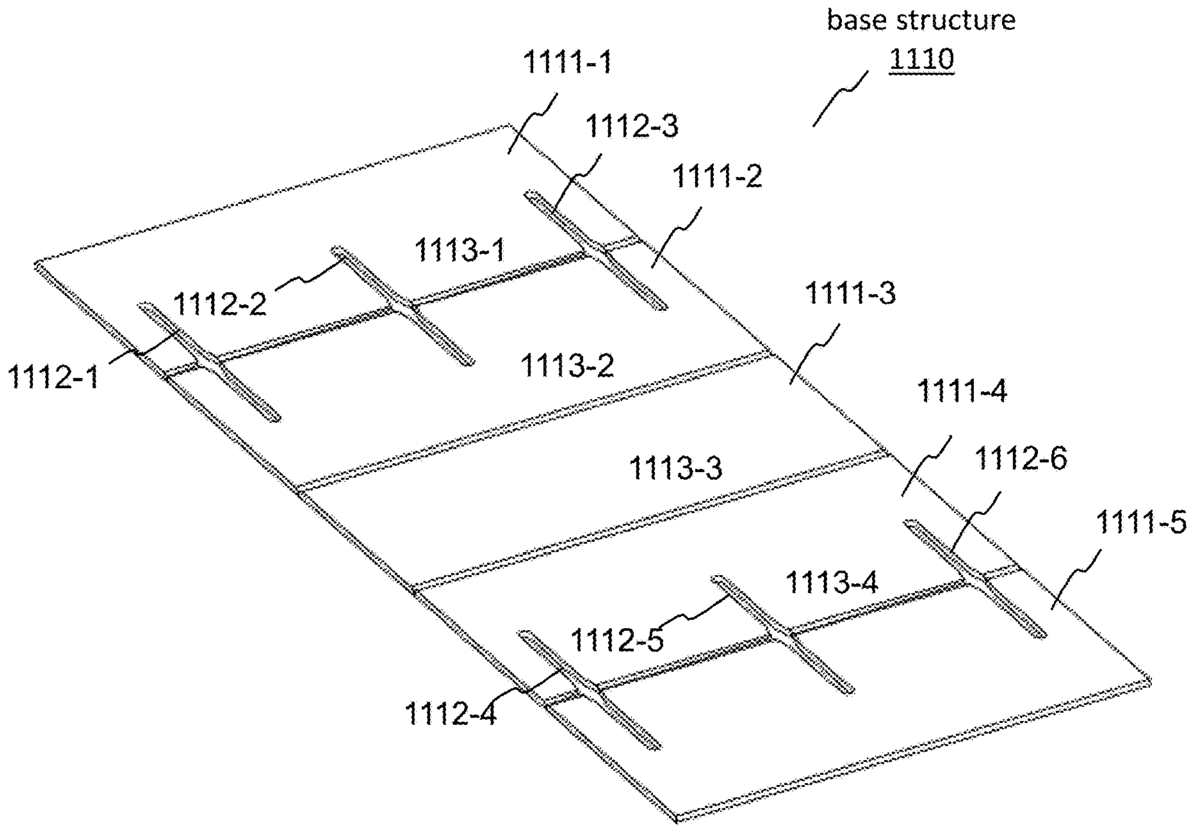
FIG. 11 depicts a base structure of a 2-cell packing structure.

FIG. 11 depicts base structure 1110. In this example, base structure 1110 is a single structure formed of a single piece of cardboard or other material. Base structure 1110 comprises sections 1111-1, 1111-2, 1111-3, 1111-4, and 1111-5; grooves 1112-1, 1112-2, 1112-3, 1112-4, 1112-5, and 1112-6; and axes 1113-1, 1113-2, 1113-3, and 1113-4. Axes 1113-1, 1113-2, 1113-3, and 1113-4 can be formed using known crease or perforation techniques.

Figure 12:
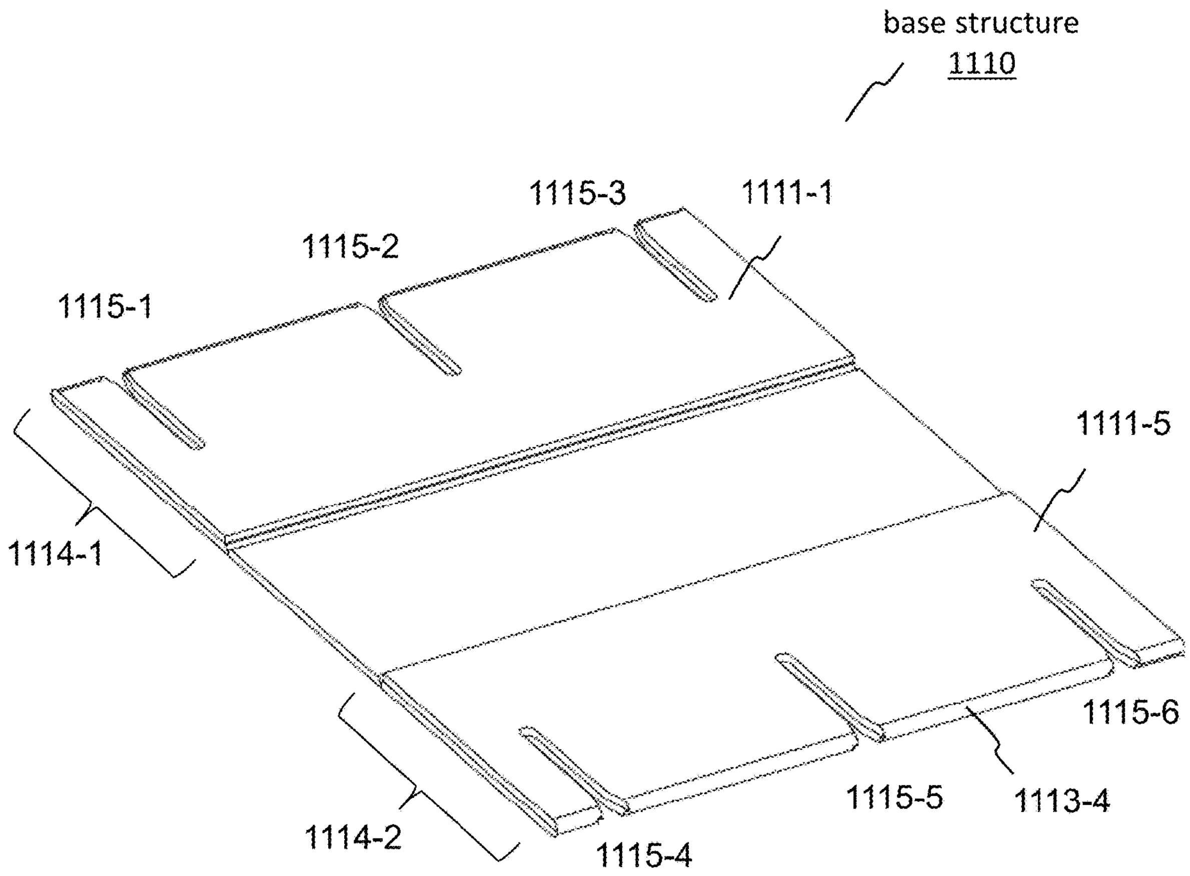
FIG. 12 depicts the base structure of the 2-cell packing structure.

FIG. 12 depicts base structure 1110 with section 1111-1 folded over section 1111-2 (hidden from view) along axis 1113-1 (hidden from view) to form folded section 1114-1 and section 1111-5 folded over section 1111-4 (hidden from view) along axis 1113-4 to form folded section 114-2. Due to the folding, grooves 1112-1, 1112-2, 1112-3, 1112-4, 1112-5, and 1112-6 are doubled over to form grooves 1115-1, 1115-2, 1115-3, 1115-4, 1115-5, and 1115-6 respectively. Grooves 1115-1, 1115-2, 1115-3, 1115-4, 1115-5, and 1115-6 are open to the outer perimeter of base structure 1110. The fold in folded section 1114-1 causes outward forces to emerge from the outer surfaces of folded section 1114-1, and the fold in folded section 1114-2 causes outward forces to emerge from the outer surfaces of folded section 1114-2.

Figure 13:
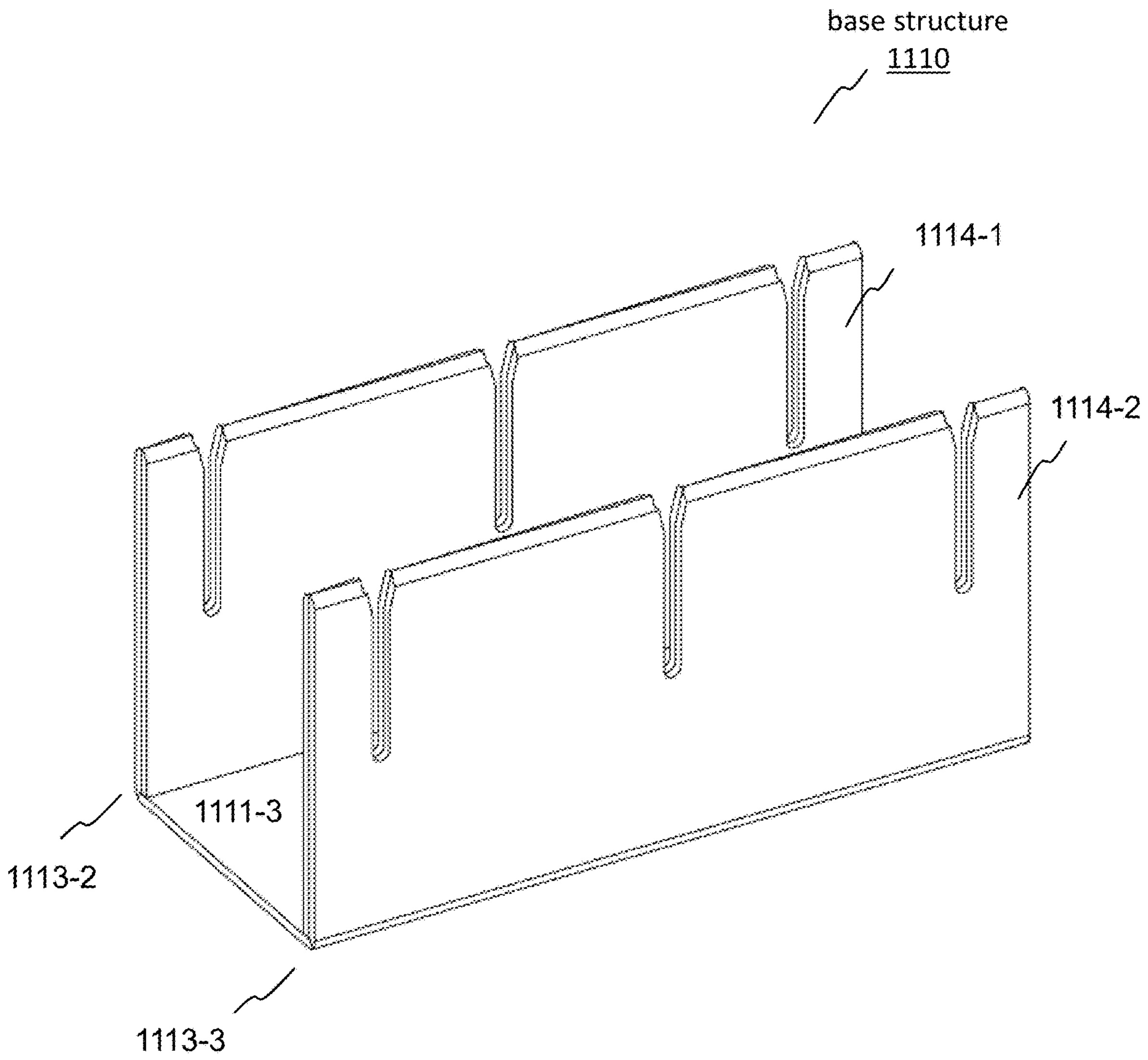
FIG. 13 depicts the base structure of the 2-cell packing structure.

FIG. 13 depicts base structure 1110 with folded section 1114-1 folded upward along axis 1113-2 to be perpendicular to section 1111-3 and folded section 1114-2 folded upward along axis 1113-3 to be perpendicular to section 1111-3.

Figure 14:
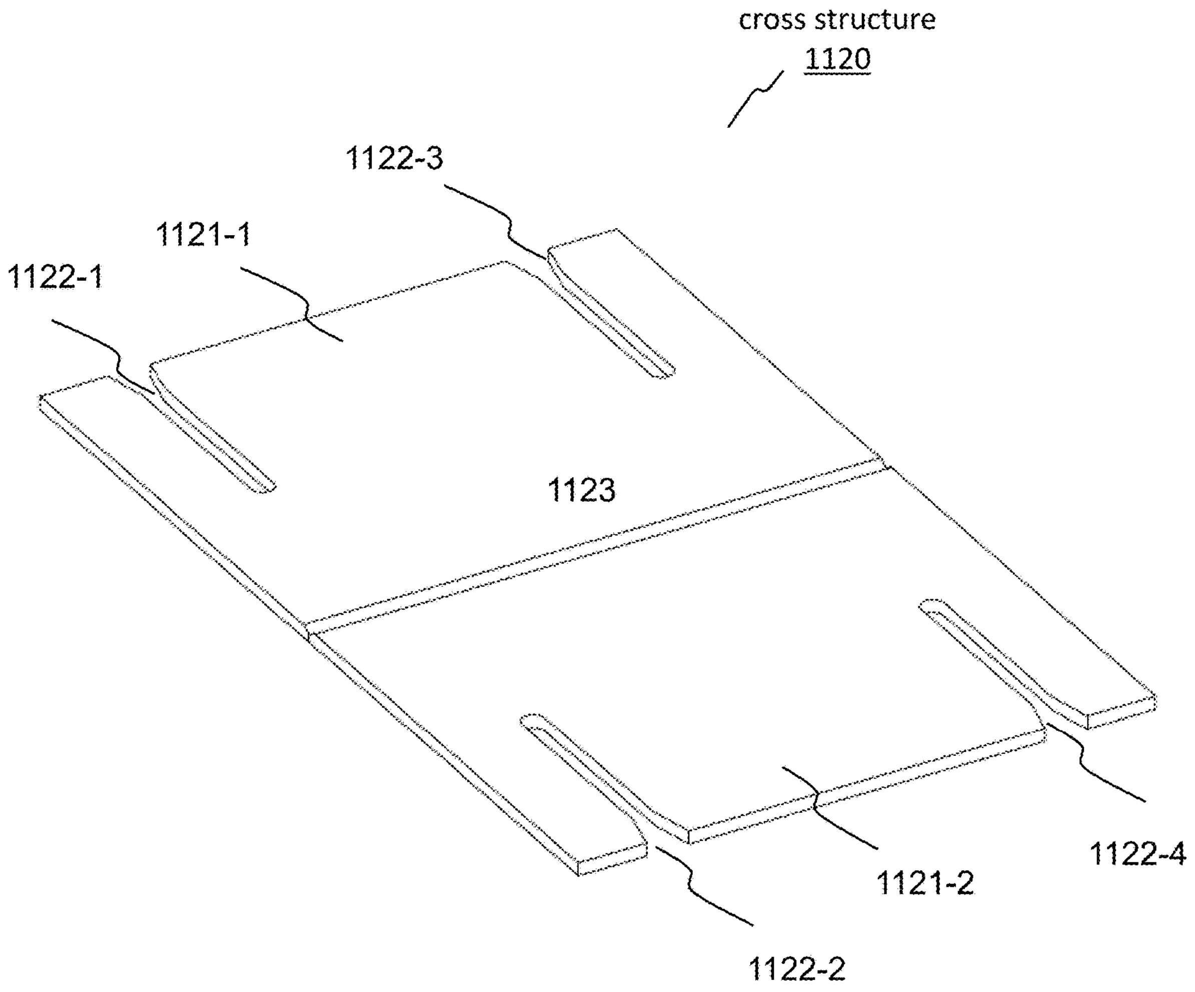
FIG. 14 depicts a cross structure of the 2-cell packing structure.
Figure 15:
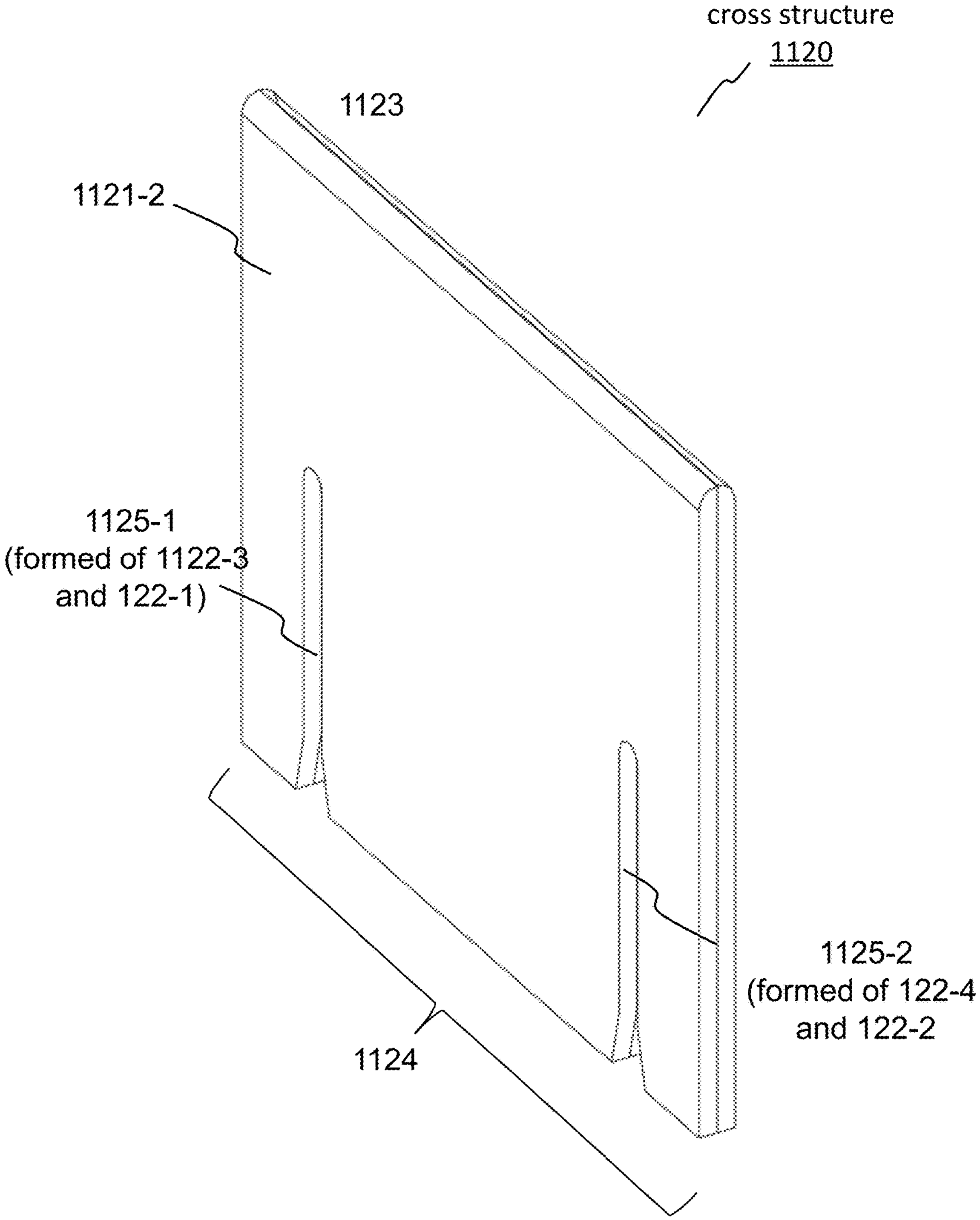
FIG. 15 depicts the cross structure of the 2-cell packing structure.

FIG. 14 depicts cross structure 1120. In this example, cross structure 1120 is a single structure formed of a single piece of cardboard or other material. Cross structure comprises sections 1121-1 and 1121-2; grooves 1122-1, 1122-2, 1122-3, and 1122-4; and axis 1123. Axis 1123 can be formed using known crease or perforation techniques FIG. 15 depicts cross structure 1120 with section 1121-2 folded over section 1121-1 (hidden from view) along axis 1123 to form folded section 1124. Due to the folding, grooves 1122-1 and 1122-2 are aligned to form groove 1125-1 grooves 1122-3 and 1122-4 are aligned to form groove 1125-2. The fold in folded section 1124 causes outward forces to emerge from the outer surfaces of folded section 1124.

Figure 16:
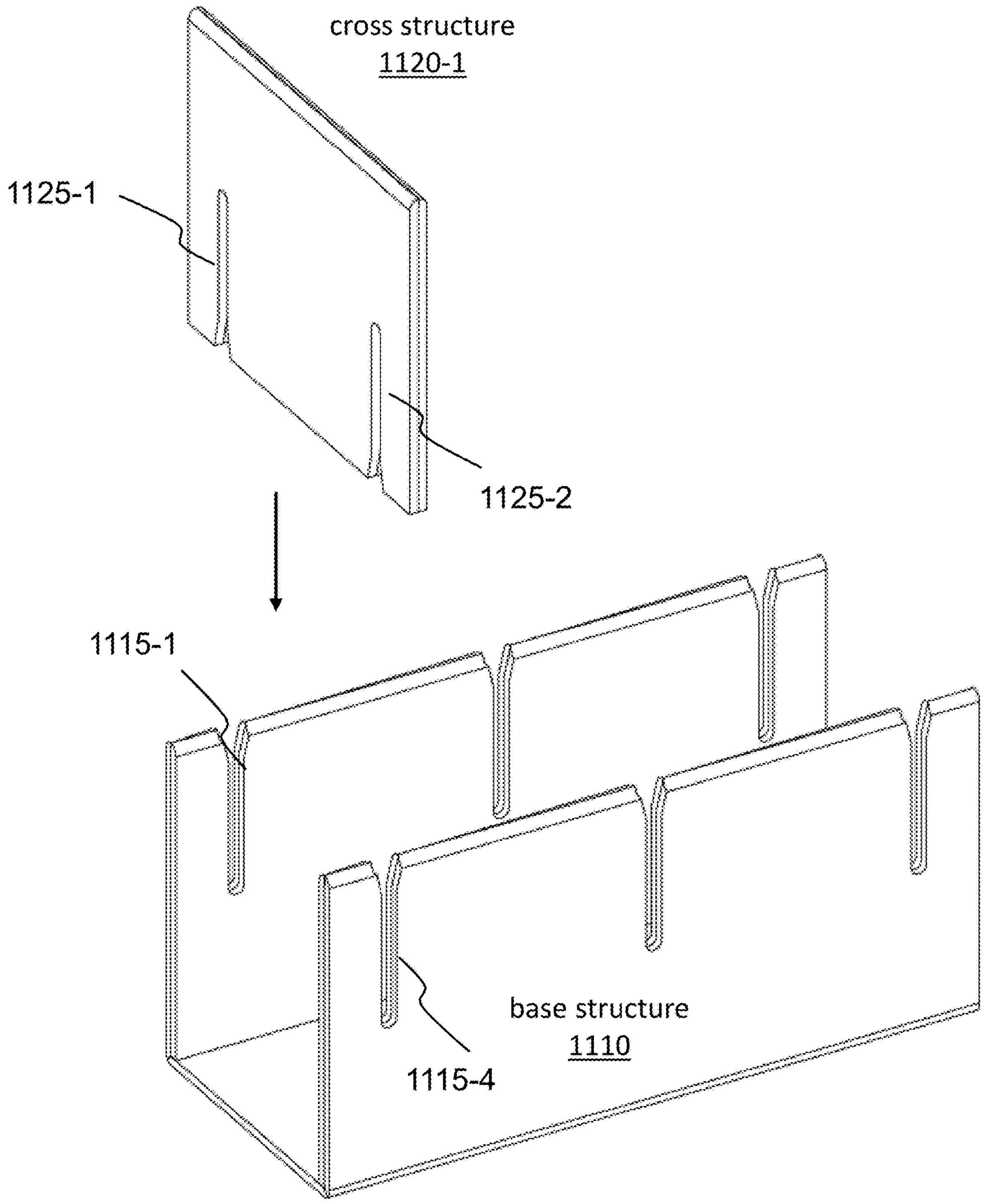
FIG. 16 depicts a first cross structure being inserted into the base structure of the 2-cell packing structure.

FIG. 16 depicts base structure 1110 and cross structure 1120-1, which is an instance of cross structure 1120. Here, cross structure 1120-1 is about to be inserted into base structure 1110, with grooves 1125-1 and 1125-2 to be cojoined with grooves 115-2 and 115-4, respectively.

Figure 17:
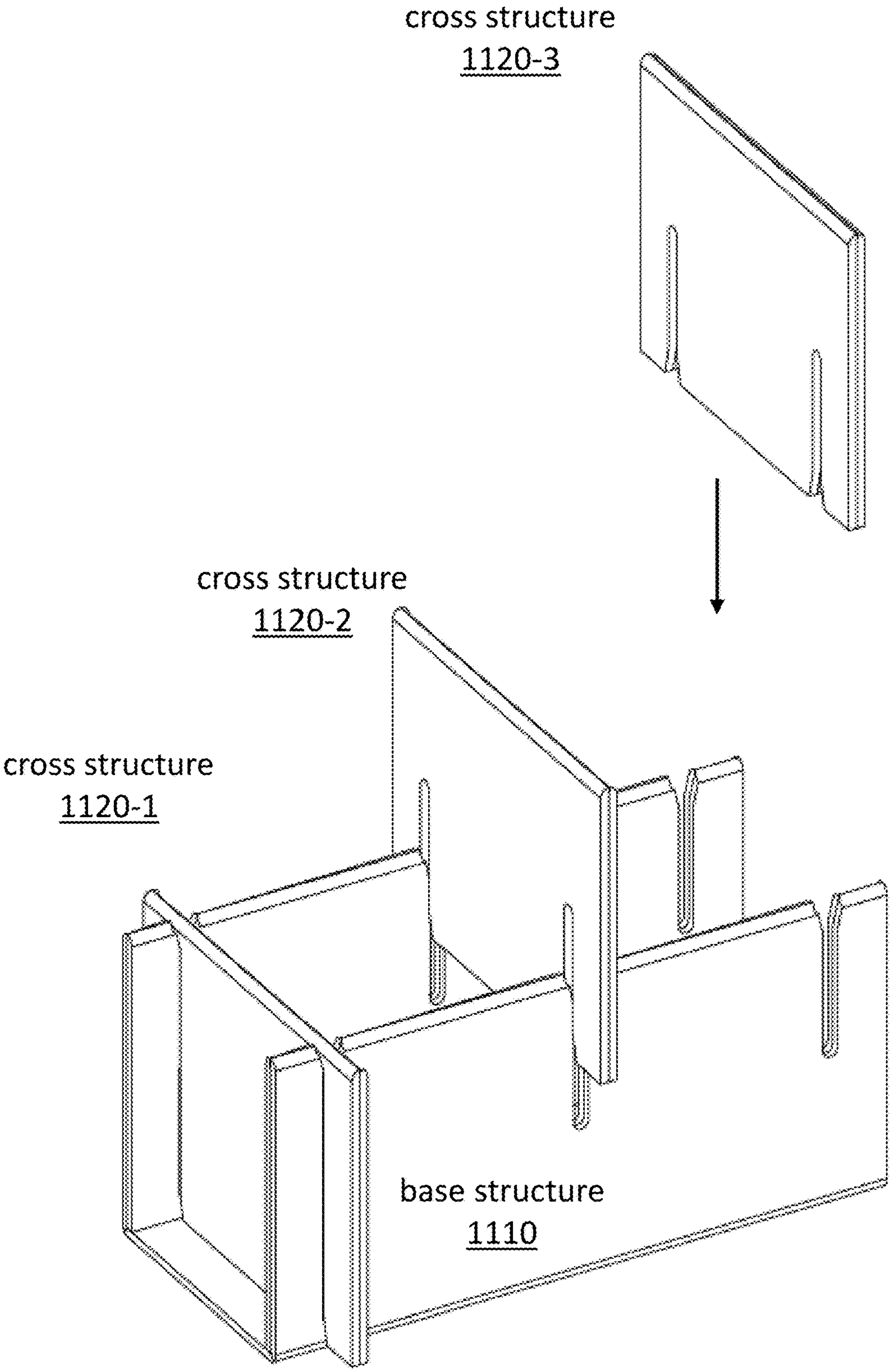
FIG. 17 depicts a first cross structure inserted into the base structure of the 2-cell packing structure and a second cross structure and a third cross structure being inserted into the base structure of the 2-cell packing structure.

FIG. 17 depicts cross structure 1120-1 fully inserted into base structure 1110. As explained previously, the folds in base structure 1110 creates outward facing forces, which in this configuration will cause the folded structure in base structure 1110 to exert force against the grooves of cross structure 1120-1. Similarly, the fold in cross structure 1120-1 creates outward facing forces, which in this configuration will case the folded structure in cross structure 1120-1 to exert force against the grooves of base structure 1110. The end result is that cross structure 1120-1 will be snugly fit in base structure 1110 with a significant amount of friction being created to keep cross structure 1120-1 firmly in place in base structure 1110. FIG. 17 also depicts cross structure 1120-2, which is an instance of cross structure 1120, in the process of being inserted into base structure 1110, and cross structure 1120-3, which is an instance of cross structure 1120, about to be inserted into base structure 1110.

Figure 18:
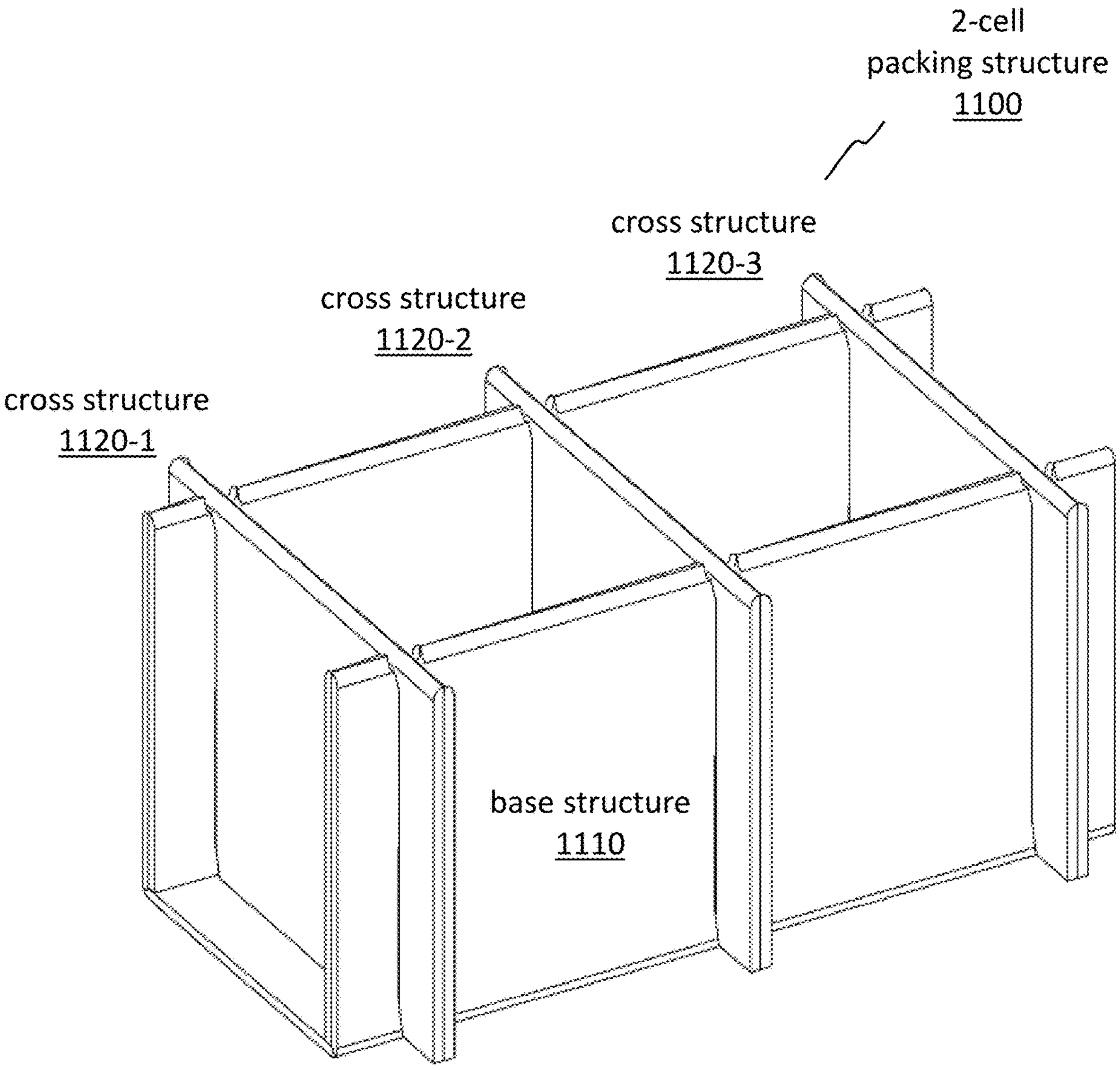
FIG. 18 depicts the 2-cell packing structure.

FIG. 18 depicts 2-cell packing structure 1100, which comprises base structure 1110, cross structure 1120-1, cross structure 1120-2, and 1120-3. Cross structures 1120-1, 1120-2, and 1120-3 are fully inserted into base structure 1110. For the same reasons described above with respect to cross structure 1120-1, cross structures 1120-2 and 1120-3 are snugly fit in base structure 1110 with a significant amount of friction being created to keep cross structures 1120-2 and 1120-3 firmly in place in base structure 1110.

Figure 19:
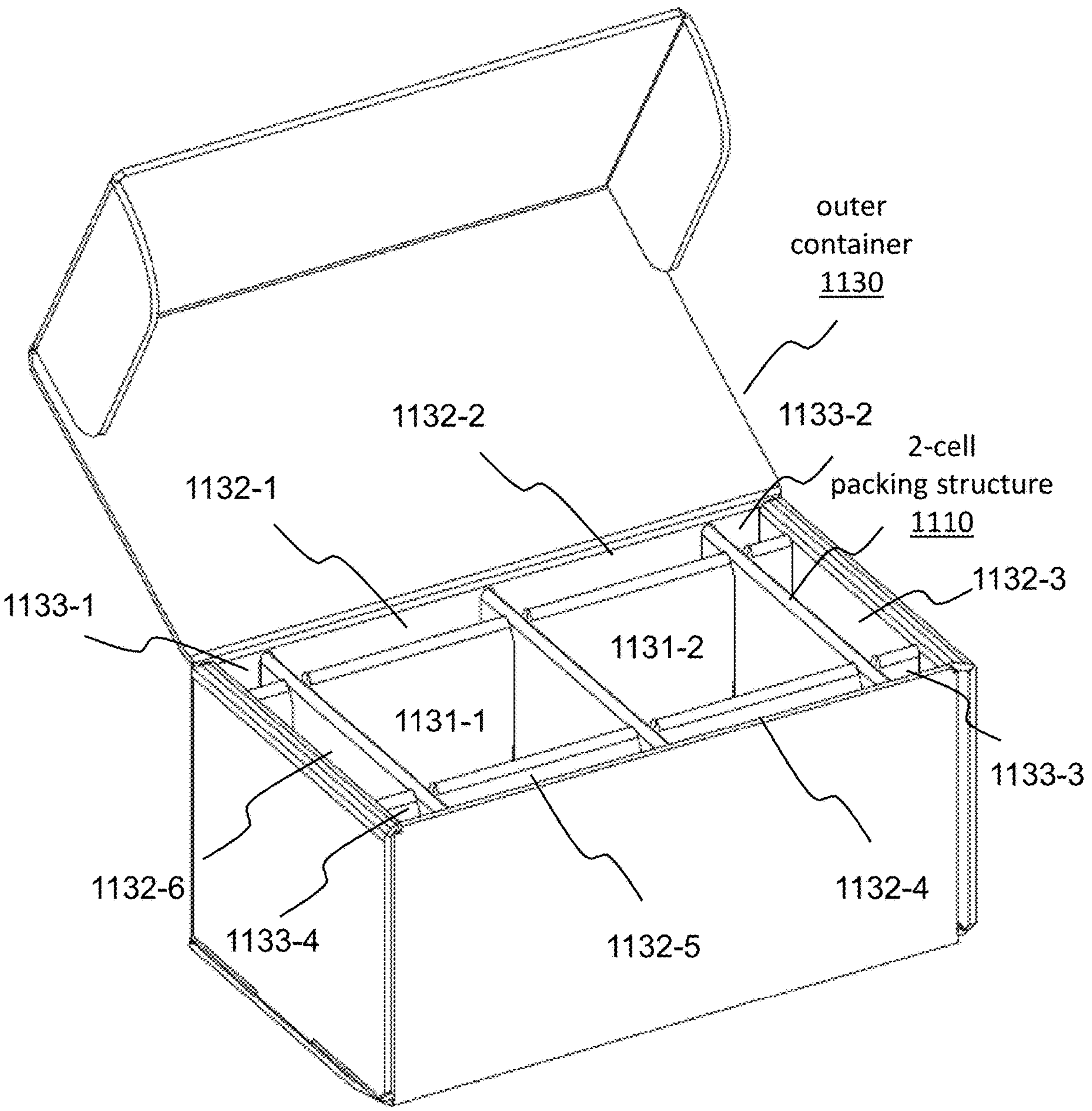
FIG. 19 depicts the 2-cell packing structure inserted into the outer container.

FIG. 19 depicts 2-cell packing structure 1100 inserted into outer container 1130. Outer container 1130 can be, for example, a shipping box formed of cardboard or plastic. 2-cell packing structure 1100 includes enclosed cells 1131-1 and 1131-2, each of which is enclosed by walls on four sides formed by base structure 1110 and cross structures 1120-1, 1120-2, and 1120-3 and physically separated from the four sides of outer container 1130 by crush zones 1132-1, 1132-2, 1132-3, 1132-4, 1132-5, and 1132-6 and corner crush zones 1133-1, 1133-2, 1133-3, and 1133-4. Enclosed cells 1131-1 and 1131-2 are the locations where the objects to be shipped are placed. Base structure 1110 and cross structures 1120-1, 1120-2, and 1120-3 are in physical contact with the four sides of outer container 1130 and provide structural rigidity to absorb impacts on outer container 1130. Furthermore, crush zones 1132-1, 1132-2, 1132-3, 1132-4, 1132-5, and 1132-6 and corner crush zones 1133-1, 1133-2, 1133-3, and 1133-4 provide volumes of space around enclosed cells 1131-1 and 1131-2 where any impact by an external object against outer container 1130 can result with the external object protruding into a crush zone or corner crush zone and deforming outer container 1130 without providing any impact to enclosed cells 1131-1 and 1131-2 or their contents.

Figure 20:
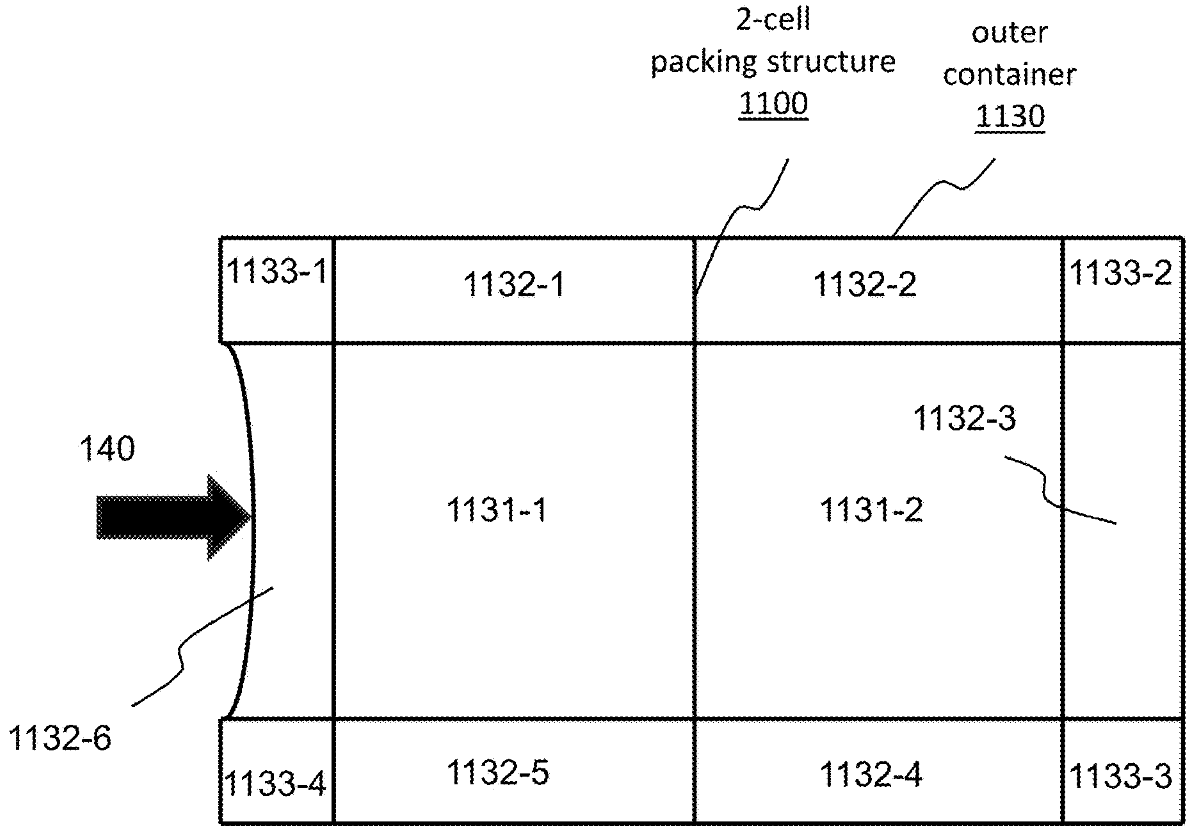
FIG. 20 depicts a top view of an external object impacting the outer container of the 2-cell packing structure.

FIG. 20 depicts 2-cell packing structure 1100 within outer container 1130 from a top-view. It can be seen that crush zones 1132-1, 1132-2, 1132-3, 1132-4, 1132-5, and 1132-6 provide safety cushions on three sides of enclosed cell 1131-1 and on three sides of enclosed cell 1131-2, and corner crush zones 1133-1, 1133-2, 1133-3, and 1133-4 provide safety cushions on two vertices of enclosed cell 1131-1 and two vertices of enclosed cell 1131-2. Enclosed cell 1131-1 provides a safety cushion on one side of enclosed cell 1131-2, and enclosed cell 1131-2 provides a safety cushion on one side of enclosed cell 1131-1. In this example, an external object 140 impacts the side of outer container 1130 (as might happen, for example, during the shipping process or if outer container 1130 falls onto another object). Crush zone 1132-6 absorbs the impact of external object 140 and outer contained 1130 is deformed in this area without allowing impact to occur to enclosed cell 1131-1 or enclosed cell 1131-2. That is, enclosed cells 1131-2 and 1131-2 are fully protected from force from external object 140.

A person of ordinary skill in the art will appreciate that the above teachings regarding 1-cell packing structure 100 and 2-cell packing structure 1100 can be extended to an n-cell packing structure, where n is an integer and represents the number of enclosed cells in the structure. In the example of FIGS. 1-10, n=1. In the example of FIGS. 11-20, n=2. n can also be any integer greater than 2.

Figure 21:
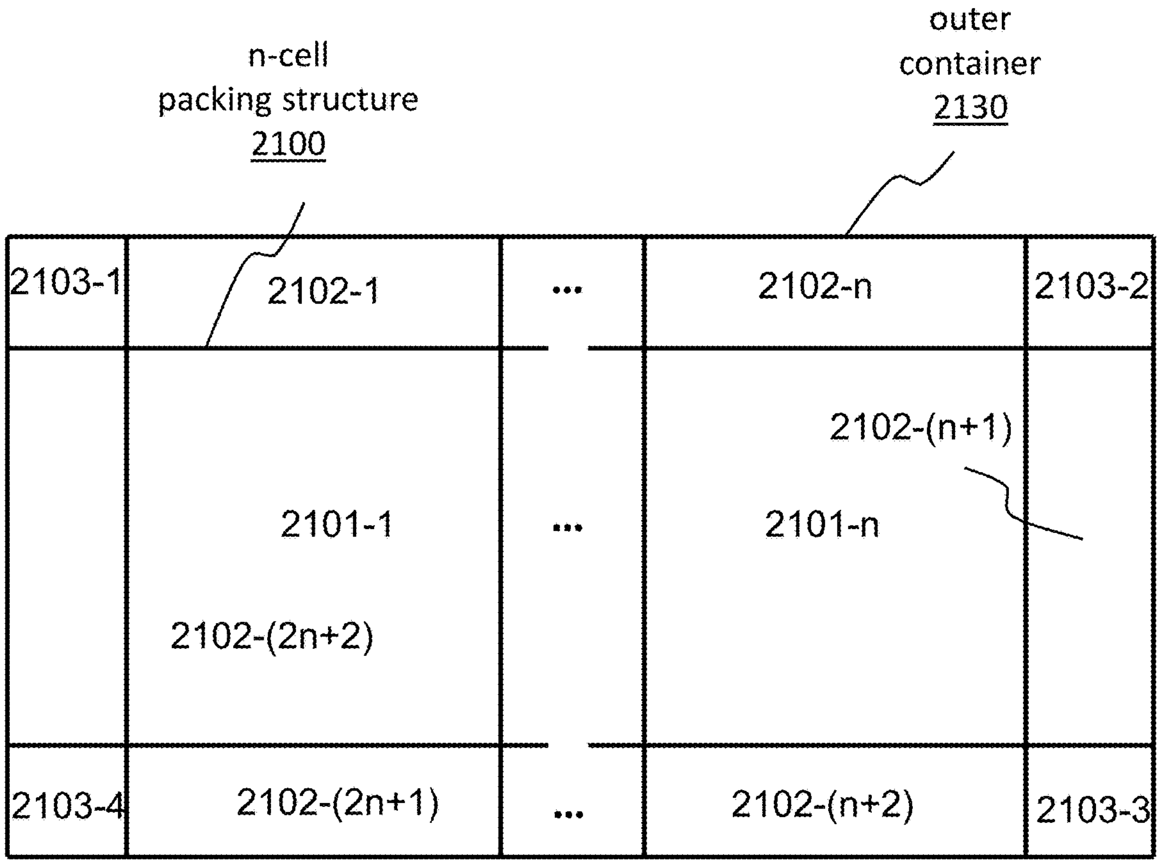
FIG. 21 depicts a top view of an outer container and an n-cell packing structure.

FIG. 21 depicts a top view of n-cell packing structure 2100 inserted in outer container 2130. n-cell packing structure 2100 comprises enclosed cells 2101-1, . . . , **2101-*n* surrounded by crush zones 2102-1, . . . , 2102-*n* on a first side, crush zone 2102**-(*n*+1) on a second side, crush zones 2102-(*n*+2), . . . , 2102-(2n+1) on a third side, crush zone 2102-(2n+2) on a fourth side, and corner crush zones 2103-1, 2103-2, 2103-3, and 2103-4 in the corners. n-cell packing structure 2100 is formed by a base structure and n+1 cross structures. The base structure is formed with the same design as base structure 1110 with n+1 pairs of opposite grooves, where each pair of opposite grooves receives one of the n+1 cross structures, and where the length of the base structure varies depending on n. Each of the n+1 cross structures is formed with the same design as cross structure 1120.

Enclosed cell 2101-1 is surrounded on three sides by crush zones 2102-1, 2102-(2n+1), and 2102-(2n+2) and on the fourth side by another enclosed cell. Enclosed cell **2101-*n* is surrounded on three sides by crush zones 2102-*n*, 2102**-(*n*+1), and 2102-(*n*+2) and on the fourth side by another enclosed cell. All other enclosed cells are surrounded on two sides by crush zones and on two sides by other enclosed cells. Two vertices of enclosed cell 2101-1 are protected by corner crush zones 2103-1 and 2103-4 and two vertices of enclosed cell **2101-*n* are protected by corner crush zones 2103-2 and 2103-3**.

FIGS. 22 to 31 depict 6-cell packing structure 2200 and a method of assembling 6-cell packing structure 2200.

Figure 22:
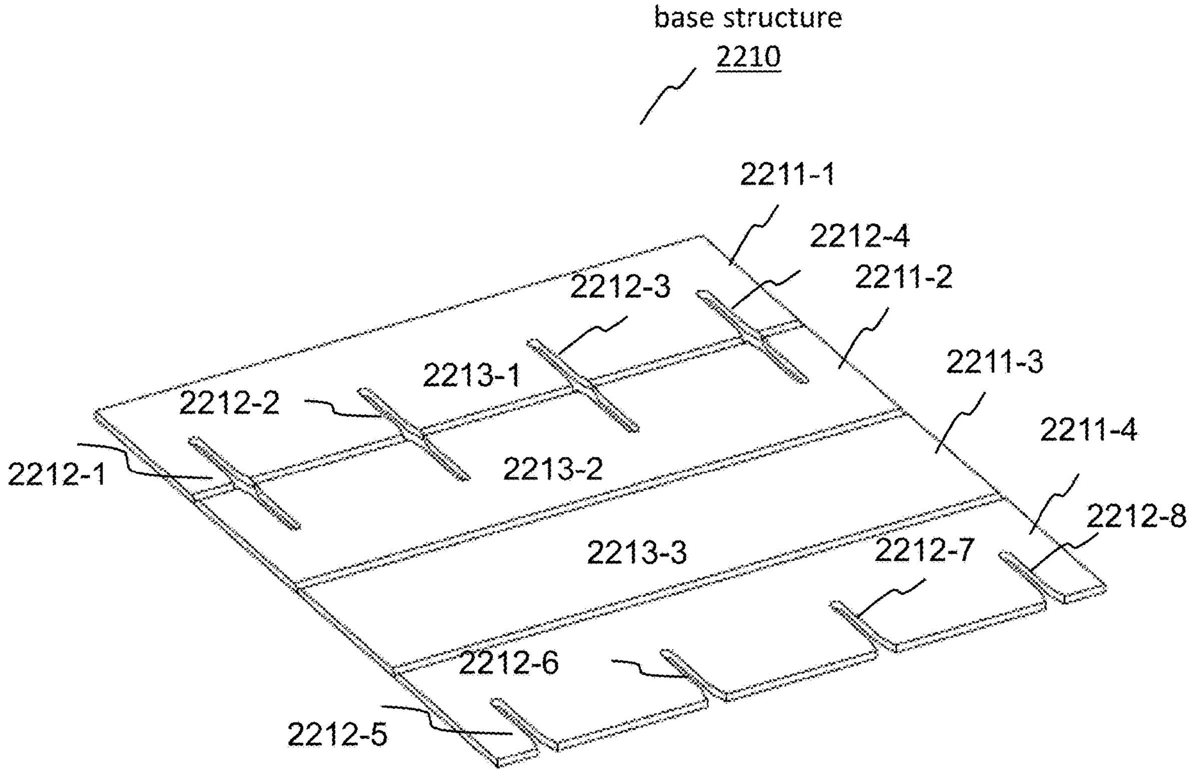
FIG. 22 depicts a base structure of a 6-cell packing structure.

FIG. 22 depicts base structure 2210. In this example, base structure 2210 is a single structure formed of a single piece of cardboard or other material. Base structure 2210 comprises sections 2211-1, 2211-2, 2211-3, and 2211-4; grooves 2212-1, 2212-2, 2212-3, 2212-4, 2212-5, 2212-6, 2212-7, and 2212-8; and axes 2213-1, 2213-2, and 2213-3. Axes 2213-1, 2213-2, and 2213-3 can be formed using known crease or perforation techniques.

Figure 23:
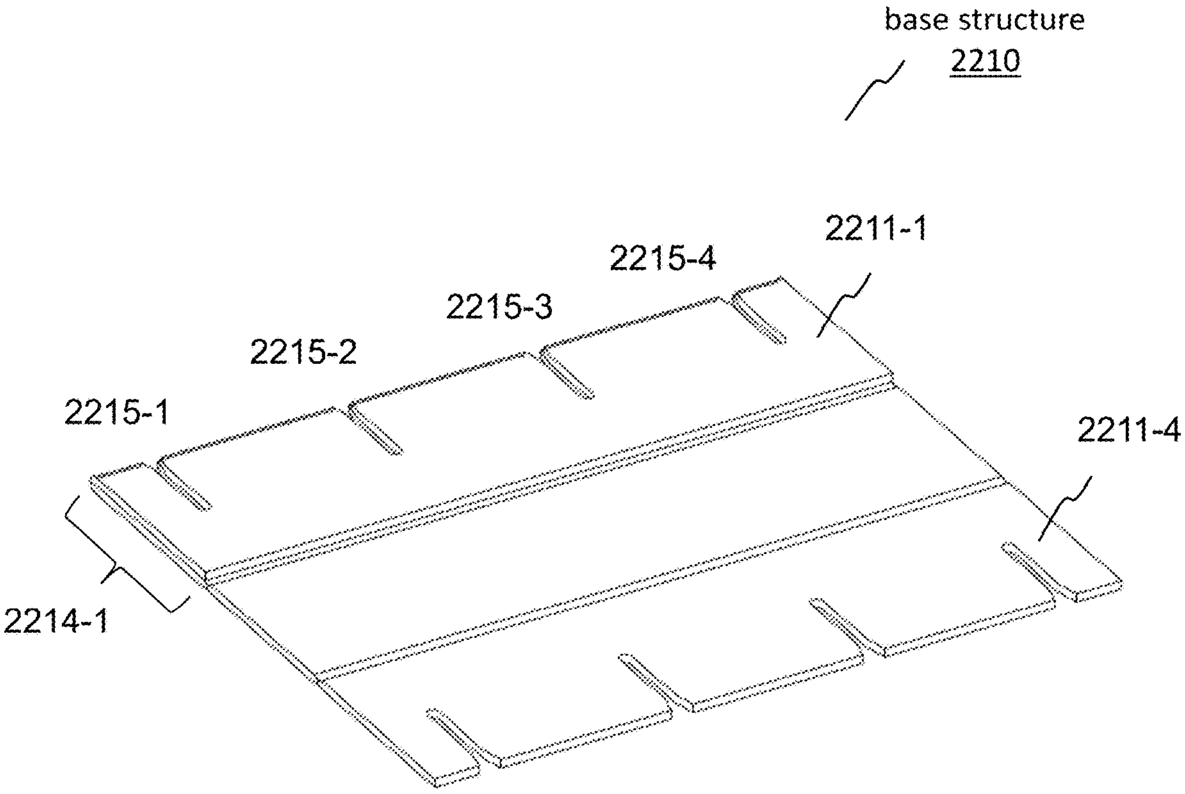
FIG. 23 depicts the base structure of the 6-cell packing structure.

FIG. 23 depicts base structure 2210 with section 2211-1 folded over section 2211-2 (hidden from view) along axis 2213-1 (hidden from view) to form folded section 2214-1. Due to the folding, grooves 2212-1, 2212-2, 2212-3, and 2212-4 are doubled over to form grooves 2215-1, 2215-2, 2215-3, and 2215-4 respectively. Grooves 2215-1, 2215-2, 2215-3, and 2215-4 are open to the outer perimeter of base structure 2210. The fold in folded section 2214-1 causes outward forces to emerge from the outer surfaces of folded section 2214-1. Notably, section 2211-4 is not folded over another section.

Figure 24:
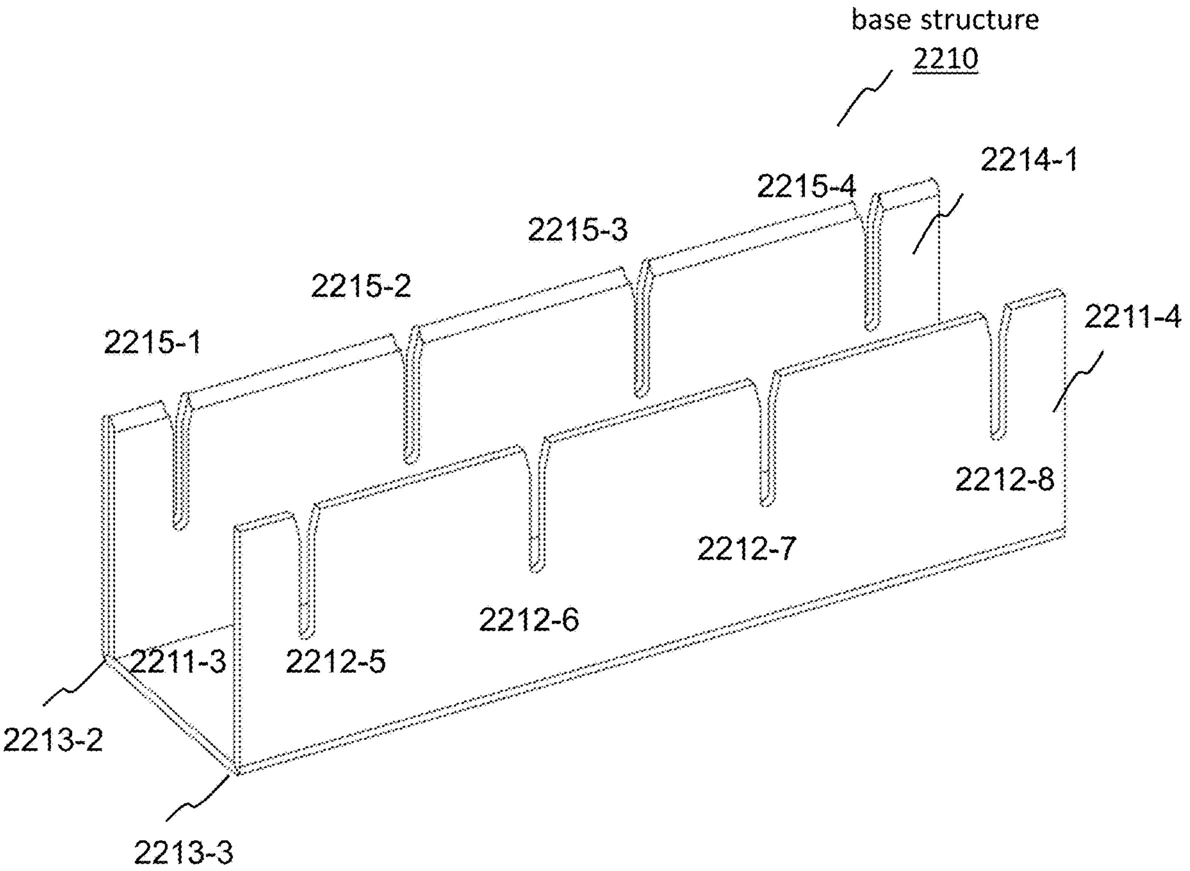
FIG. 24 depicts the base structure of the 6-cell packing structure.

FIG. 24 depicts base structure 2210 with folded section 2214-1 folded upward along axis 2213-2 to be perpendicular to section 2211-3 and section 2211-2 folded upward along axis 2213-3 to be perpendicular to section 2211-3. Grooves 2215-1, 2215-2, 2215-3, 2215-4, 2212-5, 2212-6, 2212-7, and 2212-8 are depicted as well.

Figure 25:
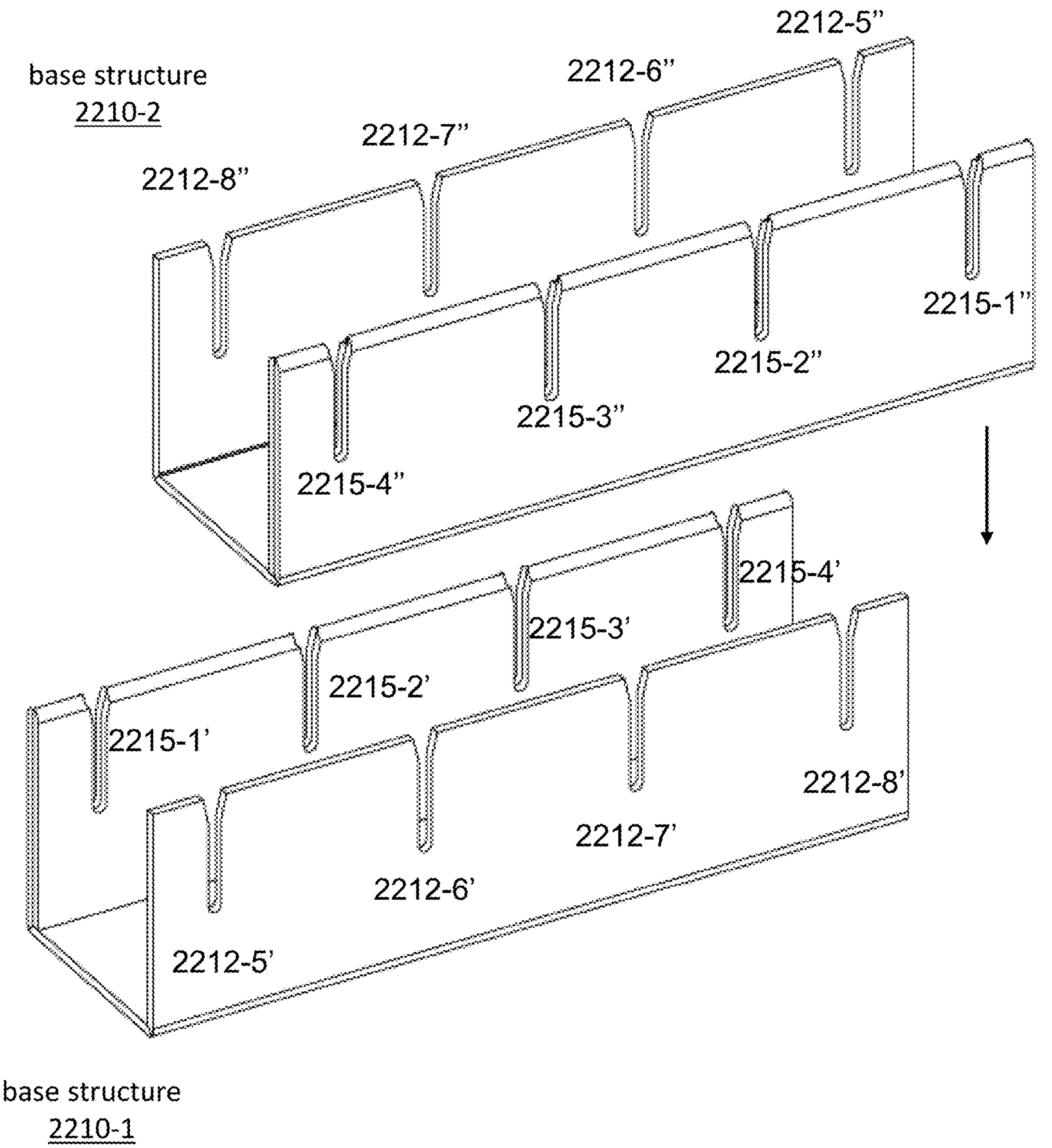
FIG. 25 depicts two instances of base structures of the 6-cell packing structure.

FIG. 25 depicts base structure 2210-1 and 2210-2, which are instances of base structure 2210. Base structure 2210-1 comprises grooves 2215-1', 2215-2', 2215-3', 2215-4', 2212-5', 2212-6', 2212-7', and 2212-8', which are instances of grooves 2215-1, 2215-2, 2215-3, 2215-4, 2212-5, 2212-6, 2212-7, and 2212-8, respectively. Base structure 2210-2 comprises grooves 2215-1", 2215-2", 2215-3", 2215-4", 2212-5", 2212-6", 2212-7", and 2212-8", which are instances of grooves 2215-1, 2215-2, 2215-3, 2215-4, 2212-5, 2212-6, 2212-7, and 2212-8, respectively. Here, base structure 2210-2 is about to be placed adjacent to base structure 2210-1, with the non-folded upright sections of each base structure placed back-to-back.

Figure 26:
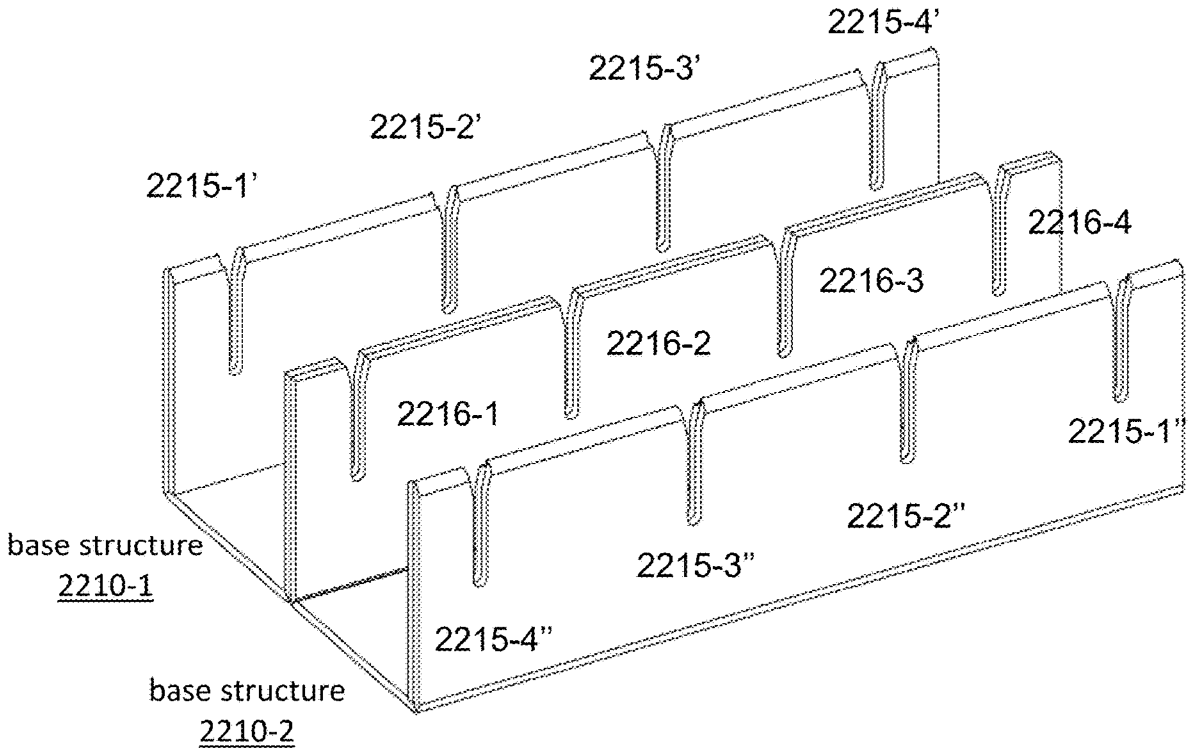
FIG. 26 depicts two instances of base structures of the 6-cell packing structure.

FIG. 26 depicts base structure 2210-1 adjacent to base structure 2210-2, with the non-folded upright sections of each base structure placed back-to-back with grooves 2212-5', 2215-6', 2215-7', and 2215-8' and grooves 2212-8", 2212-7", 2212-6", and 2212-5" in FIG. 25 forming grooves 2216-1, 2216-2, 2216-3, and 2216-4, respectively, in FIG. 26.

Figure 27:
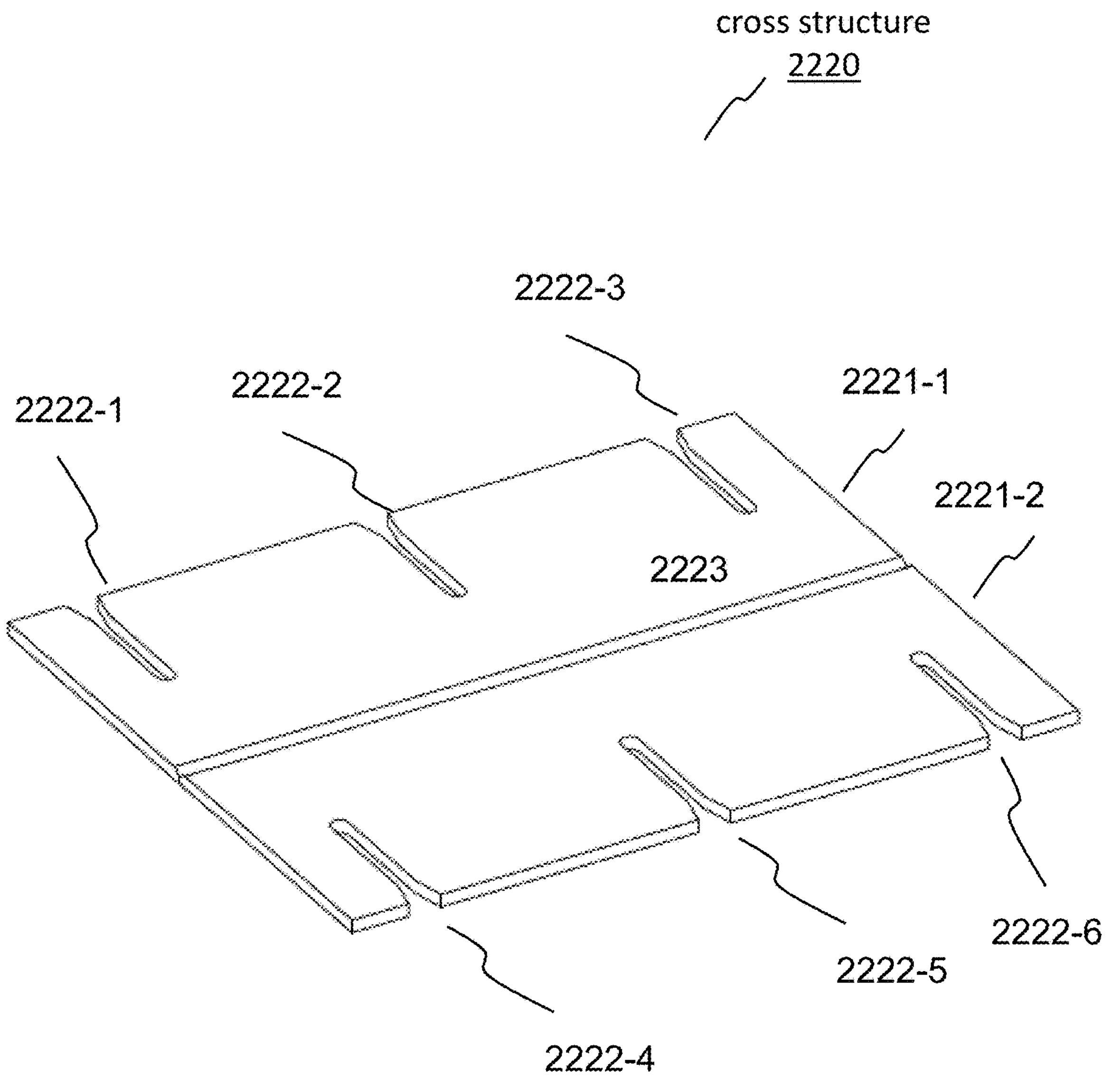
FIG. 27 depicts a cross structure of the 6-cell packing structure.

FIG. 27 depicts cross structure 2220. In this example, cross structure 2220 is a single structure formed of a single piece of cardboard or other material. Cross structure 2220 comprises sections 2221-1 and 2221-2; grooves 2222-1, 2222-2, 2222-3, 2222-4, 2222-5, and 2222-6; and axis 2223. Axis 2223 can be formed using known crease or perforation techniques.

Figure 28:
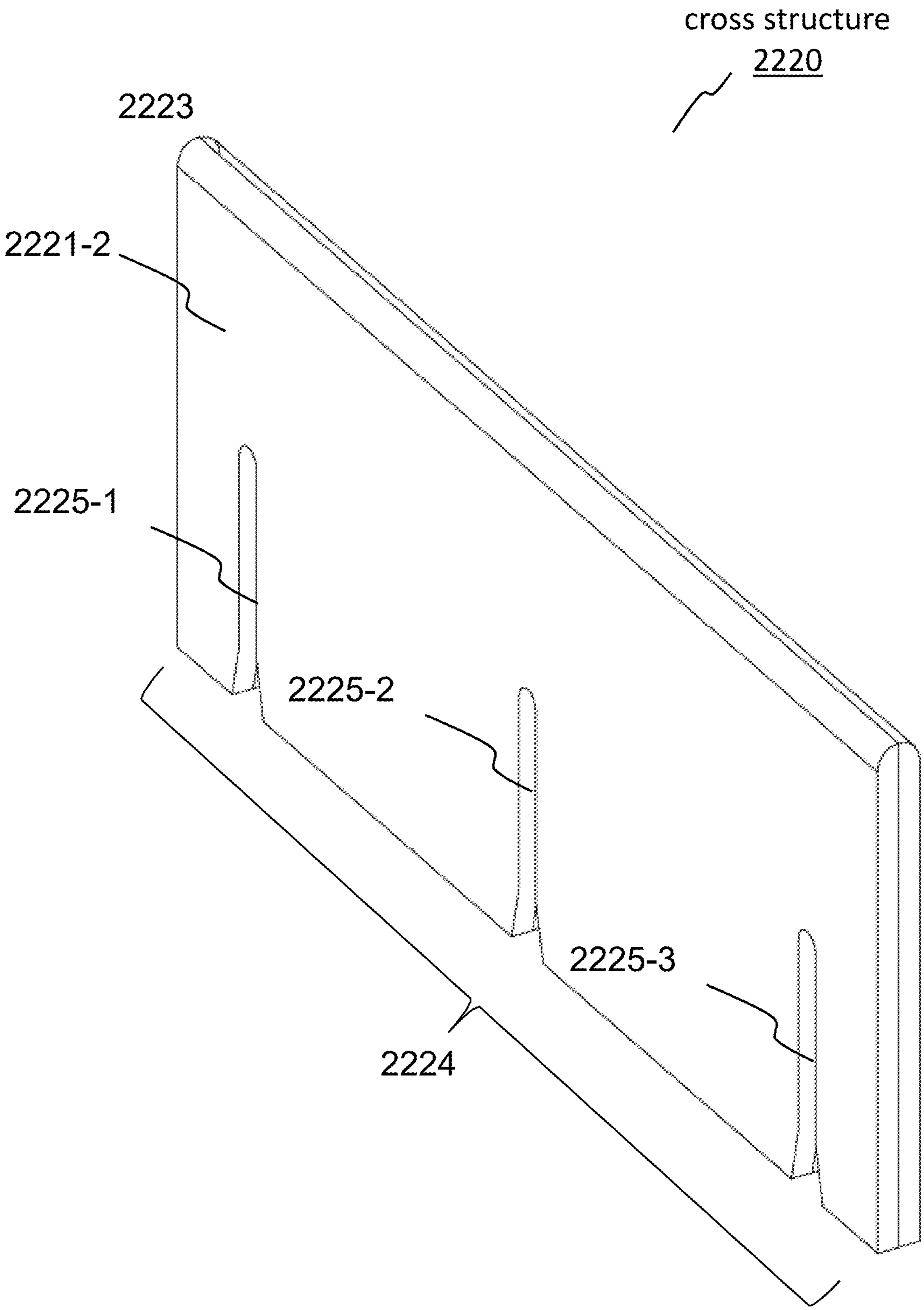
FIG. 28 depicts the cross structure of the 6-cell packing structure.

FIG. 28 depicts cross structure 2220 with section 2221-2 folded over section 2221-1 (hidden from view) along axis 2223 to form folded section 2224. Due to the folding, grooves 2222-6 and 2222-3 are aligned to form groove 2225-1, grooves 2222-5 and 2222-2 are aligned to form groove 2225-2, and grooves 2222-4 and 2222-1 are aligned to form groove 2225-1. The fold in folded section 2224 causes outward forces to emerge from the outer surfaces of folded section 2224.

Figure 29:
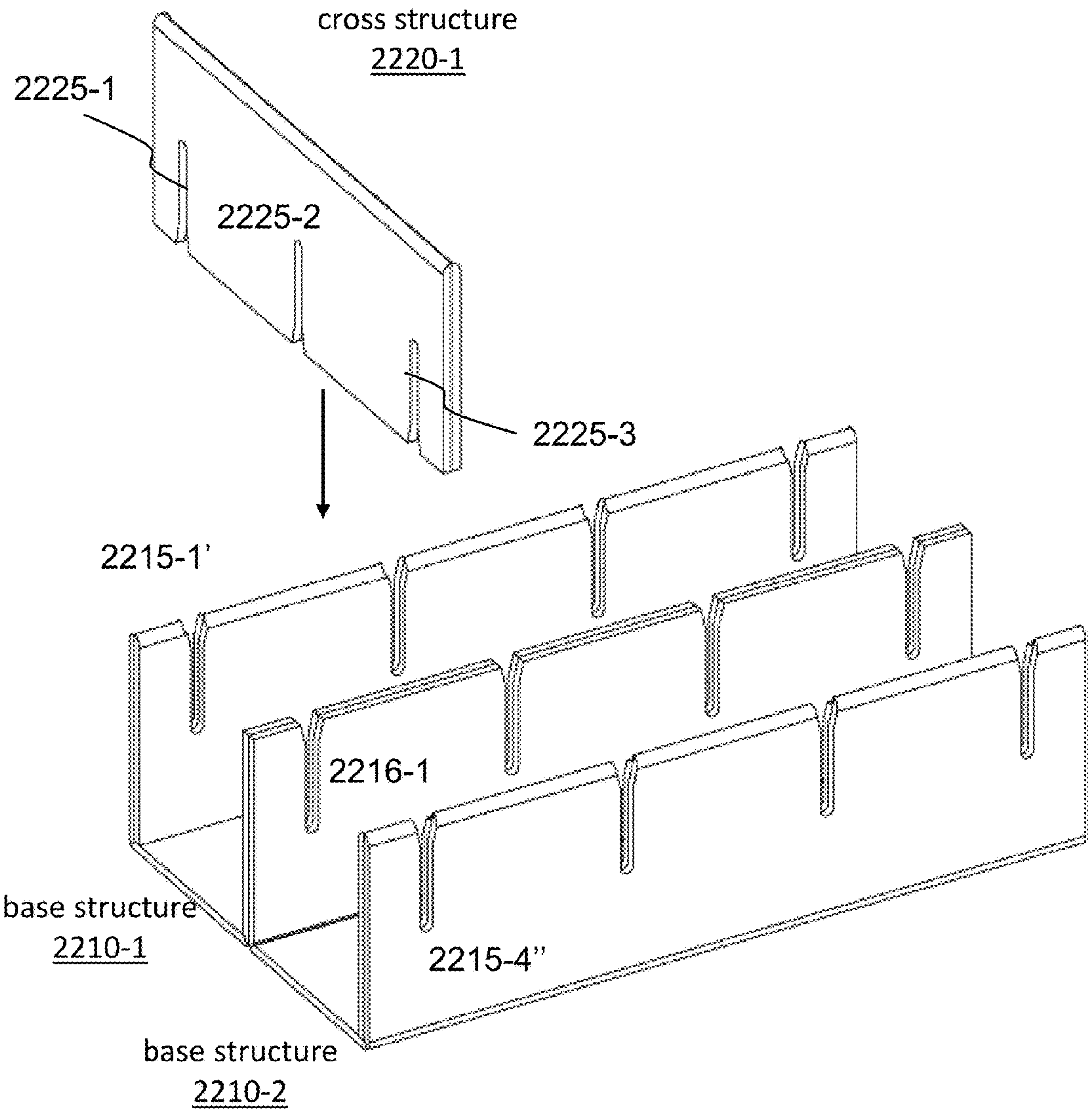
FIG. 29 depicts a first cross structure being inserted into the base structures of the 6-cell packing structure.

FIG. 29 depicts base structures 2210-1 and 2210-2 and cross structure 2220-1, which is an instance of cross structure 2220. Here, cross structure 2220-1 is about to be inserted into base structures 2210-1 and 2210-2, with grooves 2225-1, 2225-2, and 2225-3 to be cojoined with grooves 2215-1', 2216-1, and 2215-4", respectively, in base structures 2210-1 and 2210-2.

Figure 30:
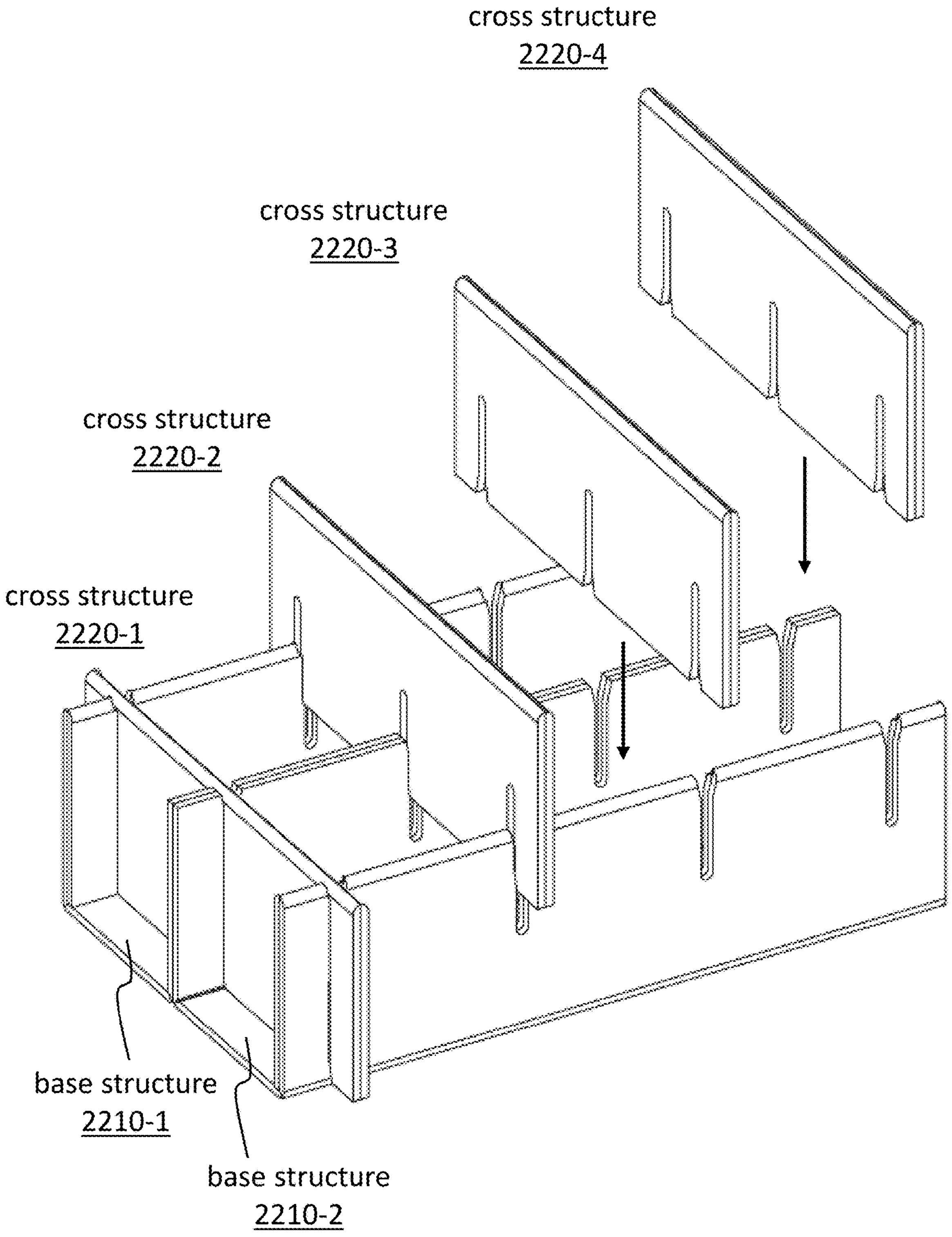
FIG. 30 depicts the first cross structure inserted into the base structures of the 6-cell packing structure and other cross structures being inserted into the base structures of the 6-cell packing structure.

FIG. 30 depicts cross structure 2220-1 fully inserted into base structures 2210-1 and 2210-2. As explained previously, the folds in base structures 2210-1 and 2210-2 create outward facing forces, which in this configuration will cause the folded structure in base structures 2210-1 and 2210-2 to exert force against the grooves of cross structure 2220-1. The single side of base structure 2210-1 and the single side of base structure 2210-2 do not have a fold creating outward facing forces, but they do have double thickness compared to a single side. The end result is that cross structure 2220-1 will be snugly fit in base structures 2210-1 and 2210-2 with a significant amount of friction being created to keep cross structure 2220-1 firmly in place in base structures 2210-1 and 2210-2 and to keep base structures 2210-1 and 2210-2 abutting with one another. FIG. 30 also depicts cross structure 2220-2, which is an instance of cross structure 2220, in the process of being inserted into base structures 2210-2 and 2210-2, and cross structures 2220-3 and 2220-4, which are instances of cross structure 2220, about to be inserted into base structures 2210-1 and 2210-2, with grooves co-joined in the same manner described with respect to cross-structure 2220-1 in FIG. 29.

Figure 31:
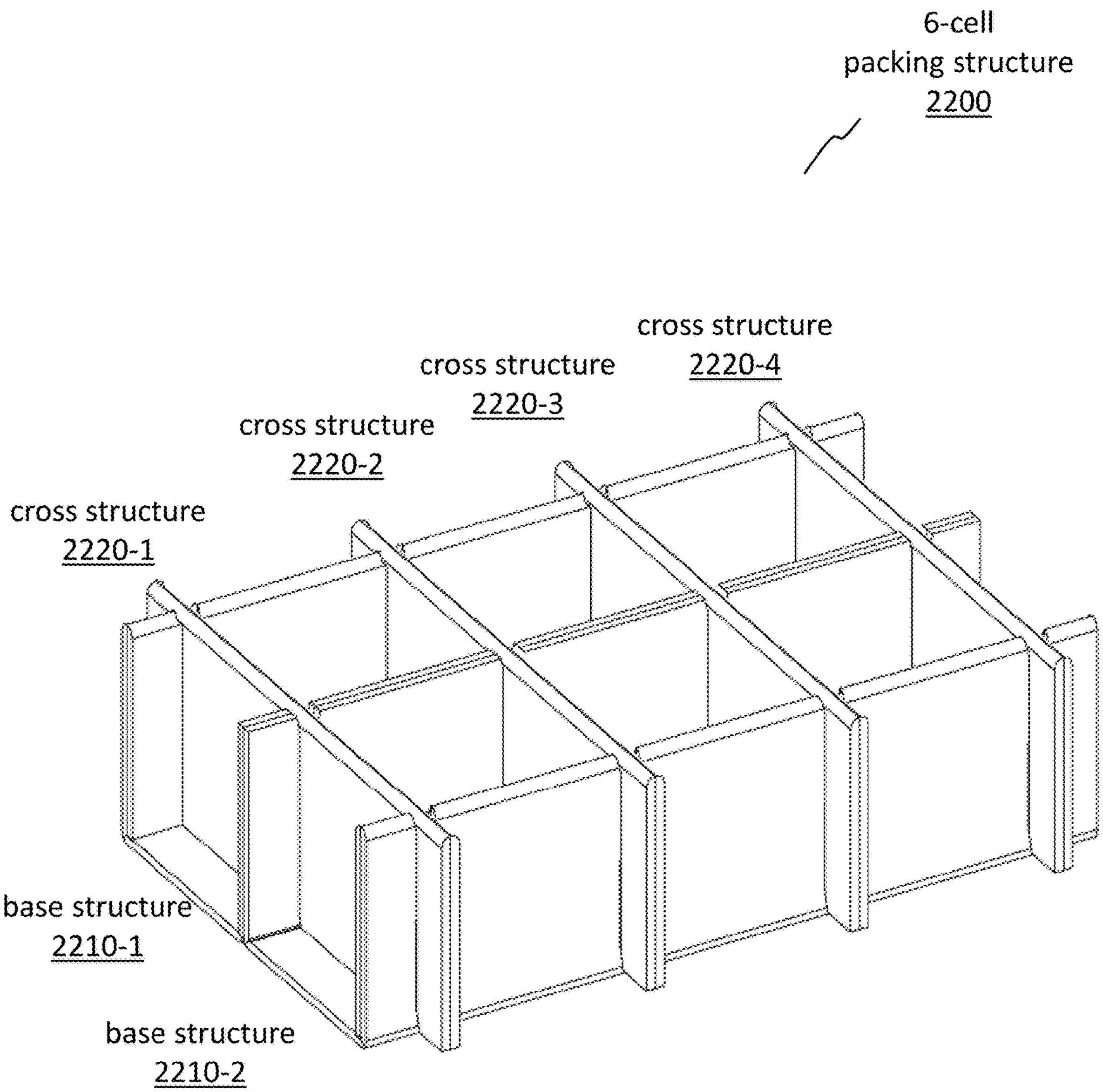
FIG. 31 depicts the 6-cell packing structure.

FIG. 31 depicts 6-cell packing structure 2200, which comprises base structures 2210-1 and 2210-2 and cross structures 2220-1, 2220-2. 2220-3, and 2220-4. Cross structures 2220-1, 2220-2. 2220-3, and 2220-4 are fully inserted into base structures 2210-1 and 2210-2. For the same reasons described above with respect to cross structure 2220-1, cross structures 2220-2, 2220-3, and 2220-4 are snugly fit in base structures 2210-1 and 2210-2 with a significant amount of friction being created to keep cross structures 2220-2, 2220-3, and 2220-4 firmly in place in base structures 2210-1 and 2210-2 and to keep base structures 2210-1 and 2210-2 abutting with one another.

Figure 32:
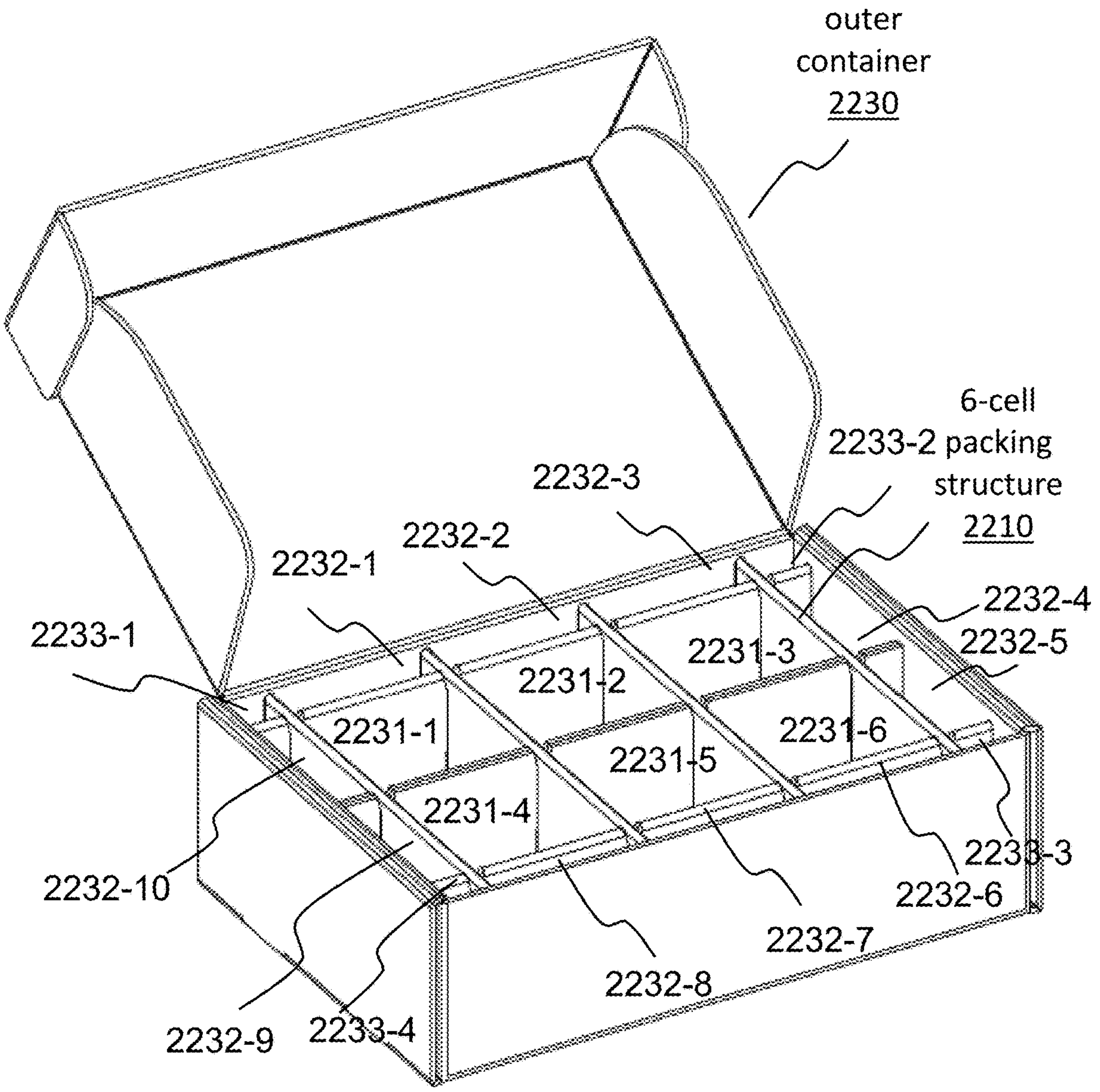
FIG. 32 depicts the 6-cell packing structure inserted into an outer container.

FIG. 32 depicts 6-cell packing structure 2210 inserted into outer container 2230. Outer container 2230 can be, for example, a shipping box formed of cardboard or plastic. 6-cell packing structure 2200 includes enclosed cells 2231-1, 2231-2, 2231-3, 2231-4, 2231-5, and 2231-6, each of which is enclosed by walls on four sides formed by base structure 2210 and cross structures 2220-1, 2220-2, 2220-3, and 2220-4 and physically separated from the four sides of outer container 2230 by crush zones 2232-1, 2232-2, 2232-3, 2232-4, 2232-5, 2232-6, 2232-7, 2232-8, 2232-9, and 2232-10 and corner crush zones 2233-1, 2233-2, 2233-3, and 2233-4 in the corners. Enclosed cells 2231-1, 2231-2, 2231-3, 2231-4, 2231-5, and 2231-6 are the locations where the objects to be shipped are placed. Base structures 2210-1 and 2210-2 and cross structures 2220-1, 2220-2, 2220-3, and 2220-4 are in physical contact with the four sides of outer container 2230 and provide structural rigidity to absorb impacts on outer container 2230. Furthermore, crush zones 2232-1, 2232-2, 2232-3, 2232-4, 2232-5, 2232-6, 2232-7, 2232-8, 2232-9, and 2232-10 and corner crush zones 2233-1, 2233-2, 2233-3, and 2233-4 provide volumes of space around enclosed cells 2231-1, 2231-2, 2231-3, 2231-4, 2231-5, and 2231-6 where any impact by an external object against outer container 2230 can result with the external object protruding into a crush zone or corner crush zone and deforming outer container 2230 without providing any impact to enclosed cells 2231-1, 2231-2, 2231-3, 2231-4, 2231-5, and 2231-6 or their contents.

Figure 33:
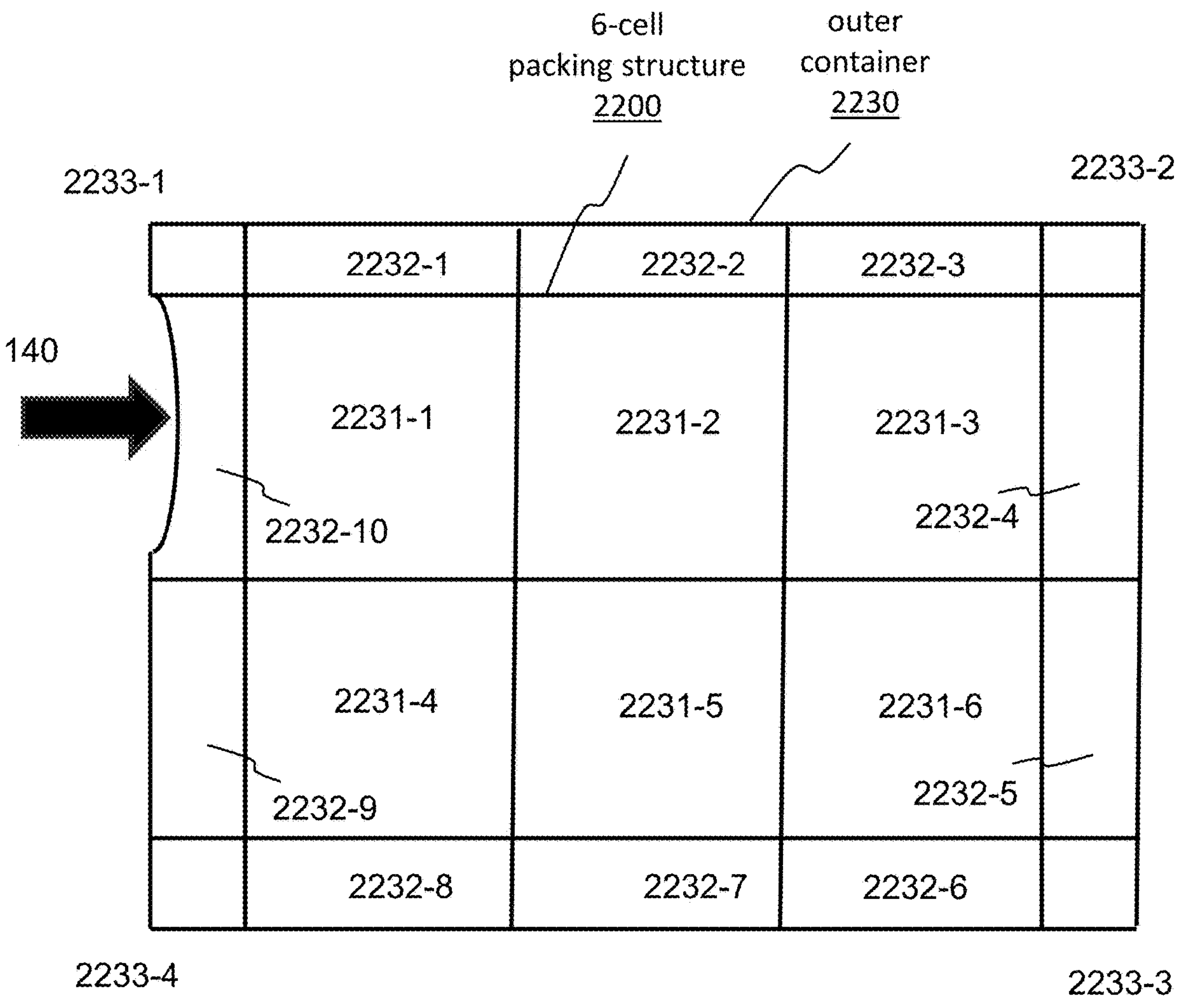
FIG. 33 depicts a top view of an external object impacting the outer container of the 6-cell packing structure.

FIG. 33 depicts 6-cell packing structure 2200 within outer container 2230 from a top-view. It can be seen that crush zones 2232-1, 2232-2, 2232-3, 2232-4, 2232-5, 2232-6, 2232-7, 2232-8, 2232-9, and 2232-10 provide safety cushions on two sides of enclosed cells 2231-1, 2231-3, 2231-4, and 2231-6 and on one side of enclosed cells 2231-2 and 2231-5 and corner crush zones 2233-1, 2233-2, 2233-3, and 2233-4 provide safety cushions on one vertex of enclosed cells 2231-1, 2231-3, 2231-6, and 2231-4, respectively. Each enclosed cell provides a safety cushion on one side of each enclosed cell that it is adjacent to. In this example, an external object 140 impacts the side of outer container 2230 (as might happen, for example, during the shipping process or if outer container 2230 falls onto another object). Crush zone 2232-10 absorbs the impact of external object 140 and outer container 2230 is deformed in this area without allowing impact to occur to enclosed cell 2231-1 or any other closed cell. That is, enclosed cells 2231-1, 2231-3, 2231-4, and 2231-6 are fully protected from force from external object 140.

Figure 34:
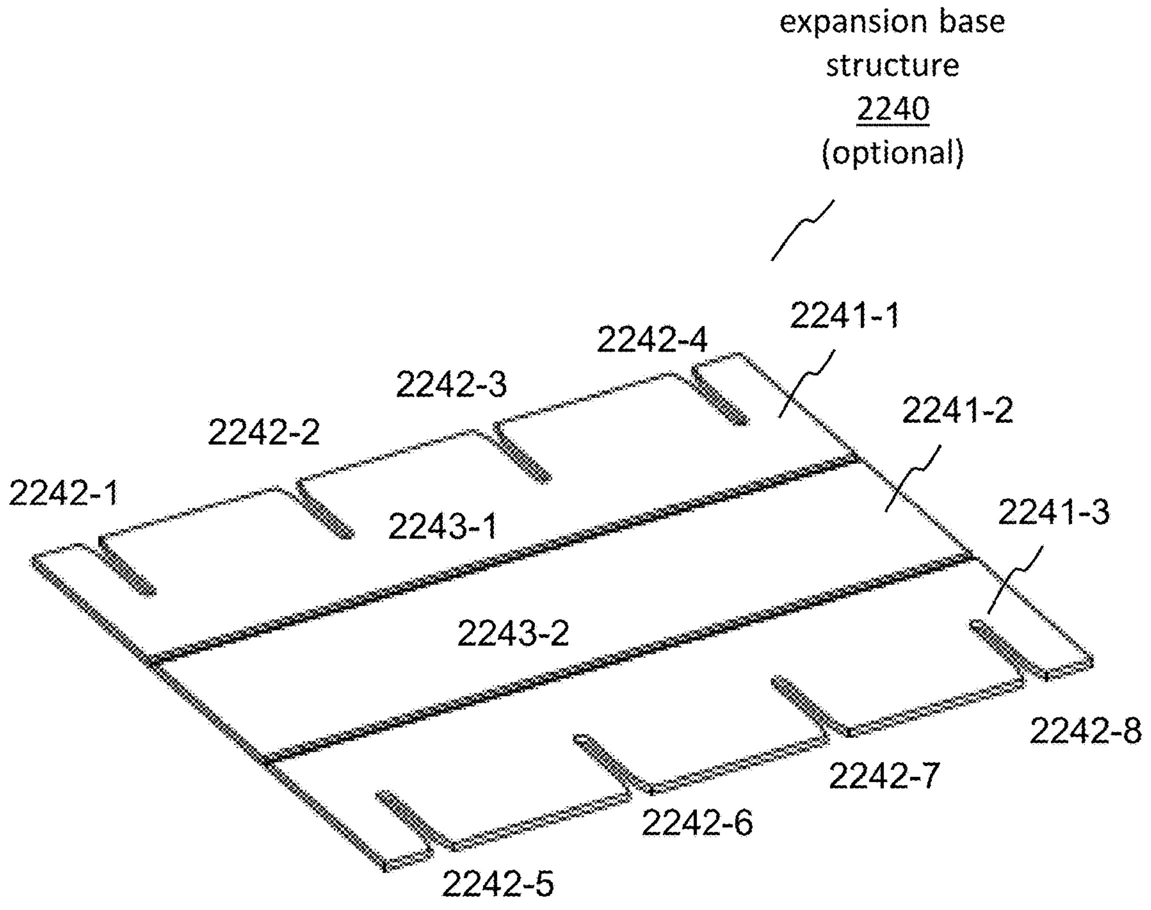
FIG. 34 depicts an expansion base structure.

FIG. 34 depicts expansion base structure 2240, one or more instances of which can optionally be added to 6-cell packing structure 2220 to add additional enclosed cells. In this example, expansion base structure 2240 is a single structure formed of a single piece of cardboard or other material. Expansion base structure 2240 comprises sections 2241-1, 2241-2, and 2241-3; grooves 2242-1, 2242-2, 2242-3, 2242-4, 2242-5, 2242-6, 2242-7, and 2242-8; axes 2243-1 and 2243-2. Axes 2243-1 and 2243-2 can be formed using known crease or perforation techniques.

Figure 35:
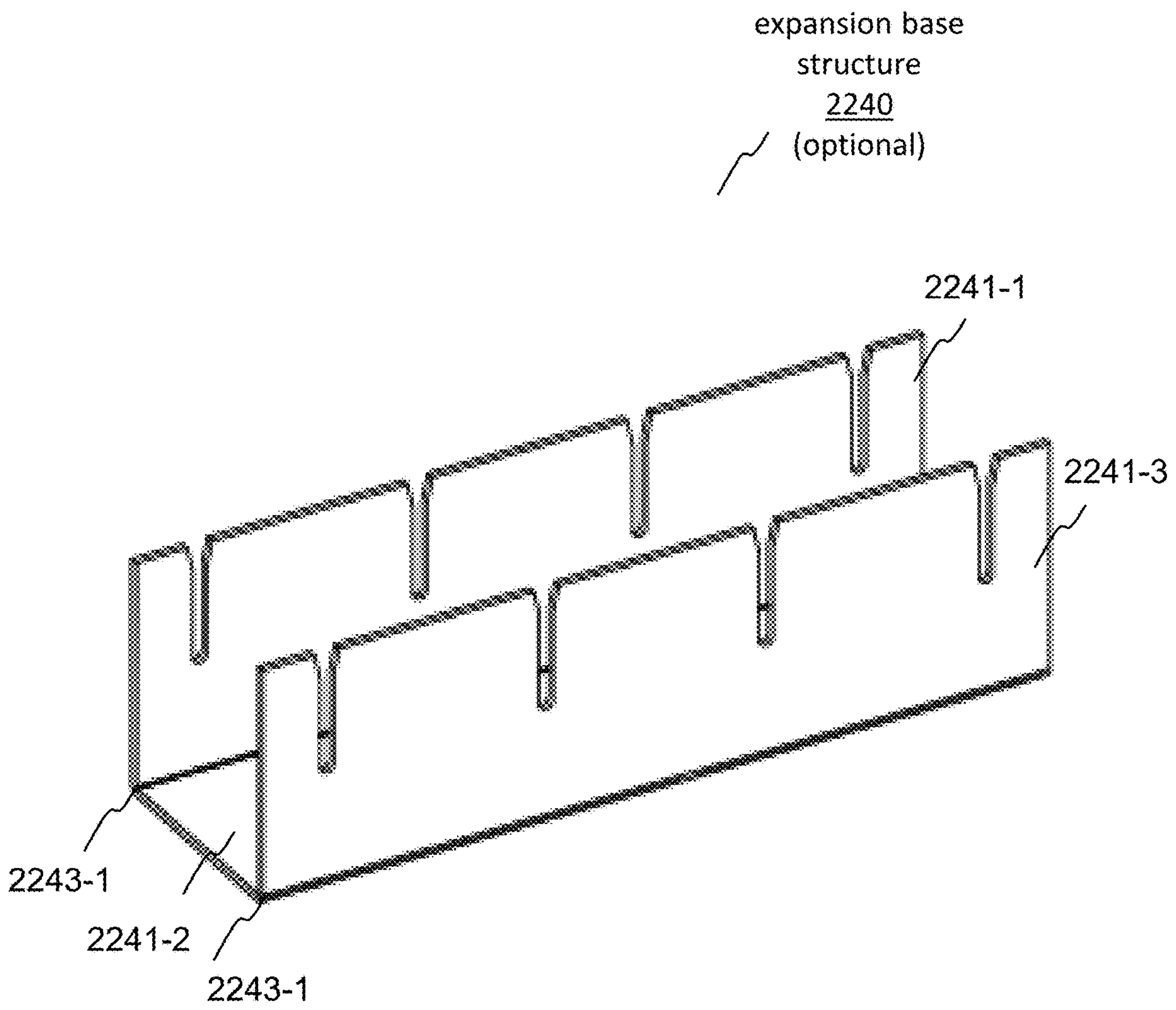
FIG. 35 depicts the expansion base structure.

FIG. 35 depicts expansion base structure 2240 with sections 2241-1 and 2241-2 folded upward along axes 2243-1 and 2243-2, respectively, to be perpendicular to section 2241-2.

A person of ordinary skill in the art will appreciate that the above teachings regarding 6-cell packing structure 2200 and expansion base structure 2240 can be extended to an n*m-cell packing structure, where n is an integer representing the number of enclosed cells in a row and m is an integer representing the number of rows (or the number of enclosed cells in a column). In the example of FIGS. 22-33, n=3 and m=2. n can also be any integer greater than 3 (by simply increasing the size of base structures and adding more cross structures), and m can be any integer greater than 2 by adding in expansion base structures 2240.

Figure 36:
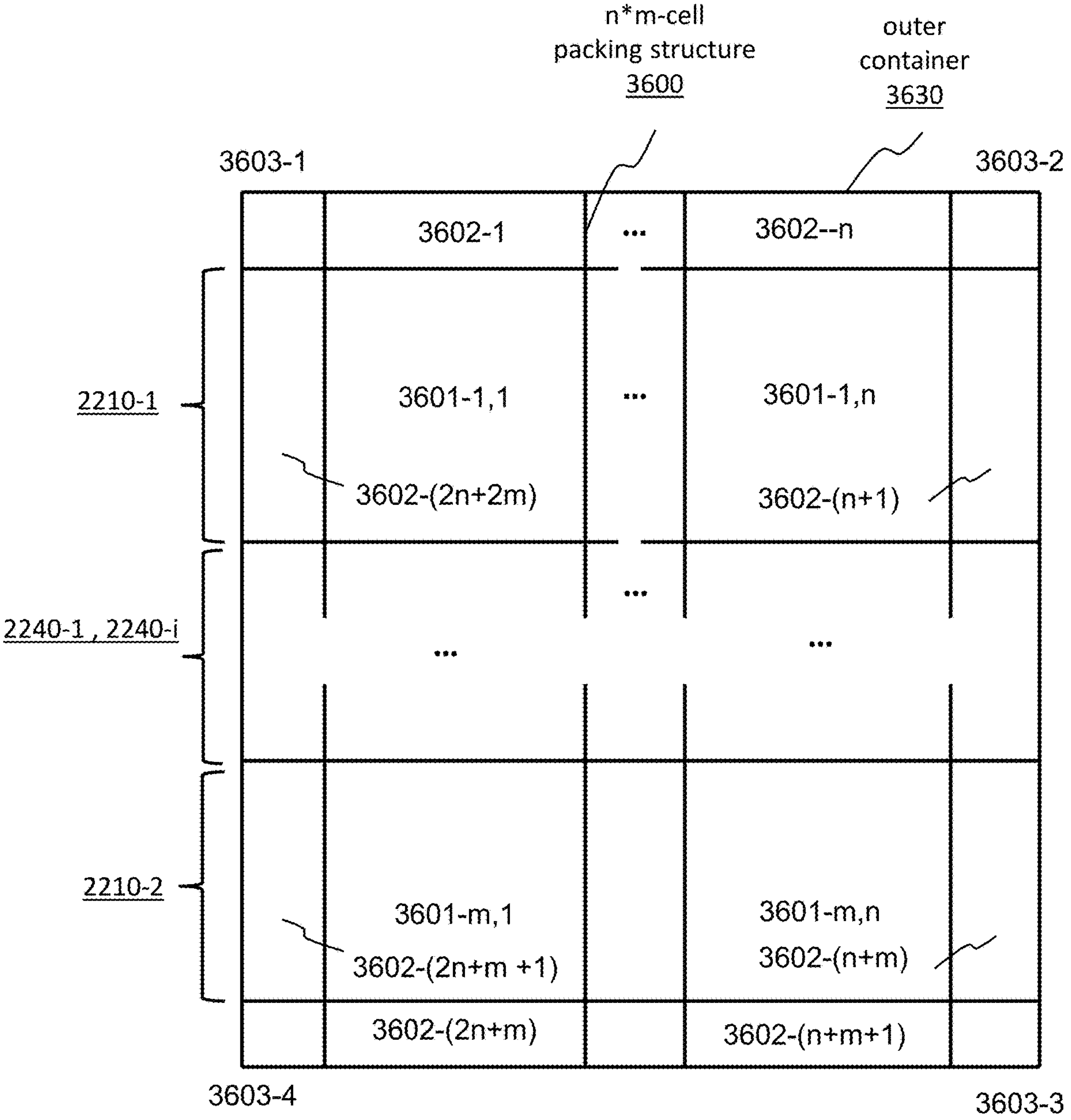
FIG. 36 depicts a top view of an outer container and an n*m-cell packing structure.

FIG. 36 depicts a top view of n*m-cell packing structure 3600 inserted in outer container 3630. n*m-cell packing structure 3600 comprises base structures 2210-1 and 2210-2 and i instances of expansion base structures 2240, where i ranges from 0 to any integer greater than 0 (here, shown as expansion base structures 2240-1, . . . , **2240-*i***). n*m-cell packing structure 3600 comprises enclosed cells 3601-1,1, . . . **3601-1,*n* in row 1 (where the nomenclature 3601-*j,k* represents enclosed cell in row j and column k), enclosed cells 3601-*m*,1, . . . , 3601-*m, n* in row m, and i rows in between, where each of the i rows is formed by adding an expansion base structure 2240**.

Enclosed cells 3601 are surrounded by crush zones 3602-1, . . . , **3602-*n* on a first size, crush zones 3602**-(*n*+1), . . . , 3602-(*n*+m) on a second side, crush zones 3602-(*n*+m+1), . . . , 3602-(2n+m) on a third side, crush zones 3602-(2n+m+1), . . . , 3602-(2n+2m) on a fourth side, and corner crush zones 3603-1, 3603-2, 3603-3, and 3603-4 in the corners. Base structures 2210-1 and 2210-2 are formed with the same design as base structure 2210 with n+1 pairs of opposite grooves, where each pair of opposite grooves receives one of the n+1 cross structures, and where the length of the base structure varies depending on n. Expansion base structures 2240-1, . . . , 2240-*i* each is formed with the same design as expansion base structure 2240 with n+1 pairs of opposite grooves, where each pair of opposite grooves receives one of the n+1 cross structures, and where the length of the base structure varies depending on n. Each of the n+1 cross structures is formed with the same design as cross structure 2220.

Each enclosed cell 3601 is surrounded on each of its four sides by a crush zone 3602 or another enclosed cell 3601. Corner crush zones 3603-1, 3603-2, 3603-3, and 3603-4 provide safety cushions on one vertex of enclosed cells 3601-1,1; 3601-1,*n*; 3601-*m*,*n*; and 3601-*m*,1, respectively.

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between).

What is claimed is:

1. A packing structure comprising:

a first base structure comprising a first section comprising a first plurality of grooves and a second section comprising a second plurality of grooves, wherein the first section is a folded section;

a second base structure comprising a third section comprising a third plurality of grooves and a fourth section comprising a fourth plurality of grooves, wherein the third section is a folded section and the second section of the first base structure is placed adjacent to the fourth section of the second base structure; and a plurality of cross structures, wherein each of the plurality of cross structures comprises a folded section comprising a plurality of grooves, and wherein the plurality of cross structures are inserted into the first base structure and the second base structure wherein the plurality of grooves in each cross structure are cojoined with one of the first plurality of grooves, one of the second plurality of grooves, one of the third plurality of grooves, and one of the fourth plurality of grooves, thereby forming one or more enclosed cells and a plurality of crush zones, wherein each of the one or more enclosed cells comprises four sides each adjacent to one of the plurality of crush zones or another enclosed cell.

2. The packing structure of claim 1, wherein the first base structure further comprises a first bottom section and the first section is perpendicular to the first bottom section and the second section is perpendicular to the first bottom section and the second base structure further comprises a second bottom section and the third section is perpendicular to the second bottom section and the fourth section is perpendicular to the second bottom section.

3. The packing structure of claim 1, wherein the first base structure is formed of a single piece of cardboard and the second base structure is formed of a single piece of cardboard.

4. The packing structure of claim 3, wherein each of the plurality of cross structures is formed of a single piece of cardboard.

5. A packing structure comprising:

a first base structure comprising a first section comprising a first plurality of grooves and a second section comprising a second plurality of grooves, wherein the first section is a folded section;

a second base structure comprising a third section comprising a third plurality of grooves and a fourth section comprising a fourth plurality of grooves, wherein the third section is a folded section;

one or more expansion base structures placed between the first base structure and the second base structure, each of the one or more expansion base structures comprising a plurality of grooves; and a plurality of cross structures, wherein each of the plurality of cross structures comprises a folded section comprising a plurality of grooves, and wherein the plurality of cross structures are inserted into the first base structure, the second base structure, and the one or more expansion base structures wherein the plurality of grooves in each cross structure are cojoined with one of the first plurality of grooves, one of the second plurality of grooves, one of the third plurality of grooves, and one of the fourth plurality of grooves and two grooves in each of the one or more expansion base structures, thereby forming one or more enclosed cells and a plurality of crush zones, wherein each of the one or more enclosed cells comprises four sides each adjacent to one of the plurality of crush zones or another enclosed cell.

6. The packing structure of claim 5, wherein the first base structure further comprises a first bottom section and the first section is perpendicular to the first bottom section and the second section is perpendicular to the first bottom section and the second base structure further comprises a second bottom section and the third section is perpendicular to the second bottom section and the fourth section is perpendicular to the second bottom section.

7. The packing structure of claim 5, wherein the first base structure is formed of a single piece of cardboard and the second base structure is formed of a single piece of cardboard.

8. The packing structure of claim 7, wherein each of the plurality of cross structures is formed of a single piece of cardboard.

9. A method of assembling a packing structure comprising:

forming a base structure by:

folding a first section along a first axis to abut a second section to form a first folded section;

folding a third section along a second axis to abut a fourth section to form a second folded section;

folding the first folded section to be perpendicular to a bottom section; and folding the second folded section to be perpendicular to the bottom section;

forming a plurality of cross structures by:

for each of the plurality of cross structures, folding a section along an axis to abut another section; and inserting the plurality of cross structures into the base structure to form one or more enclosed cells and a plurality of crush zones, where each of the one or more enclosed cells comprises four sides each adjacent to one of the plurality of crush zones or another enclosed cell.

10. The method of claim 9, wherein the one or more enclosed cells consists of one enclosed cell.

11. The method of claim 9, wherein the one or more enclosed cells consists of two enclosed cells.

12. The method of claim 9, wherein the one or more enclosed cells consists of more than two enclosed cells.

13. The method of claim 9, wherein the base structure is formed of a single piece of cardboard.

14. The method of claim 13 wherein each of the plurality of cross structures is formed of a single piece of cardboard.

15. The method of claim 9, wherein the first axis comprises a first crease and the second axis comprises a second crease.

16. The method of claim 9, wherein the first axis comprises a first perforation and the second axis comprises a second perforation.

17. A method of assembling a packing structure comprising:

forming a first base structure by:

folding a first section along a first axis to abut a second section to form a first folded section;

folding the first folded section along a second axis so that the first folded section is perpendicular to a first bottom section; and folding a third section along a third axis so that the third section is perpendicular to the first bottom section;

forming a second base structure by:

folding a fourth section along a fourth axis to abut a fifth section to form a second folded section;

folding the second folded section along a fifth axis so that the second folded section is perpendicular to a second bottom section; and folding a sixth section along a sixth axis so that the sixth section is perpendicular to the second bottom section;

forming one or more expansion base structures by, for each of the one or more expansion base structures:

folding a seventh section along a seventh axis so that the seventh section is perpendicular to a third bottom section; and folding an eighth section along an eighth axis so that the eighth section is perpendicular to the third bottom section;

forming a plurality of cross structures by:

for each of the plurality of cross structures, folding a section along an axis to abut another section; and inserting the plurality of cross structures into the first base structure, the second base structure, and the one or more expansion base structures to form one or more enclosed cells and a plurality of crush zones, wherein each of the one or more enclosed cells comprises four sides each adjacent to one of the plurality of crush zones or another enclosed cell.

18. The method of claim 17, wherein the first base structure is formed of a single piece of cardboard and the second base structure is formed of a single piece of cardboard.

19. The method of claim 18, wherein each of the plurality of cross structures is formed of a single piece of cardboard.

* * * * *